(12) United States Patent
Chistyakov et al.

(10) Patent No.: US 10,867,042 B2
(45) Date of Patent: Dec. 15, 2020

(54) SYSTEM AND METHOD FOR TRAINING A MALWARE DETECTION MODEL

(71) Applicant: AO Kaspersky Lab, Moscow (RU)

(72) Inventors: Alexander S. Chistyakov, Moscow (RU); Ekaterina M. Lobacheva, Moscow (RU); Alexey M. Romanenko, Moscow (RU)

(73) Assignee: AO KAPERSKY LAB, Moscow (RU)

( * ) Notice: Subject to any disclaimer, the term of this patent is extended or adjusted under 35 U.S.C. 154(b) by 302 days.

(21) Appl. No.: 16/005,916

(22) Filed: Jun. 12, 2018

(65) Prior Publication Data

US 2019/0114539 A1 Apr. 18, 2019

Related U.S. Application Data

(60) Provisional application No. 62/574,254, filed on Oct. 19, 2017.

(30) Foreign Application Priority Data

Oct. 18, 2017 (RU) ................................ 2017136618

(51) Int. Cl.
*G06F 21/56* (2013.01)
*G06N 20/00* (2019.01)
*G06N 3/08* (2006.01)

(52) U.S. Cl.
CPC ............. *G06F 21/566* (2013.01); *G06N 3/08* (2013.01); *G06N 20/00* (2019.01); *G06F 2221/034* (2013.01)

(58) Field of Classification Search
CPC .. G06F 21/566; G06F 21/50; G06F 2221/034; G06N 20/00; G06N 3/08
See application file for complete search history.

(56) References Cited

U.S. PATENT DOCUMENTS 10,581,888 B1 * 3/2020 Agranonik ............. H04L 63/20
2008/0127336 A1 5/2008 Sun et al.
(Continued)

FOREIGN PATENT DOCUMENTS

EP 2750070 A2 2/2014
RU 2427890 C2 8/2011

OTHER PUBLICATIONS

Kilgallon Sean et al: "Improving the effectiveness and efficiency of dynamic malware analysis with machine learning", 2017 Resilience Week (RWS), IEEE, Sep. 18, 2017 (Sep. 18, 2017), pp. 30-36.

*Primary Examiner* — Kirstine L Kincaid
*Assistant Examiner* — Alexander R Lapian
(74) *Attorney, Agent, or Firm* — Arent Fox LLP; Michael Fainberg

(57) ABSTRACT

Disclosed are systems and methods generating a convolution function for training a malware detection model. An example method comprises generating, by a processor, a plurality of behavior patterns based on one or more logs of commands executed on a computing device, calculating, by the processor, an effectiveness of each of a plurality of methods for machine learning based on the plurality of behavior patterns, determining, by the processor, a preferred method for machine learning from the plurality of methods for machine learning by selecting the preferred method as a method with the greatest effectiveness from the plurality of methods for machine learning, obtaining, by the processor, parameters of the malware detection model by applying convolution functions to the plurality of behavior patterns, training, by the processor, the malware detection model to detect malicious files using the preferred method for machine learning.

24 Claims, 7 Drawing Sheets

(56) References Cited

U.S. PATENT DOCUMENTS

| | | | |
|---|---|---|---|
| 2012/0174227 A1* | 7/2012 | Mashevsky | G06F 21/562 |
| | | | 726/24 |
| 2015/0096023 A1 | 4/2015 | Medaq et al. | |
| 2015/0161386 A1 | 6/2015 | Gupta et al. | |
| 2017/0024660 A1* | 1/2017 | Chen | H04L 63/1433 |
| 2018/0211041 A1* | 7/2018 | Davis | G06F 21/566 |

* cited by examiner

SYSTEM AND METHOD FOR TRAINING A MALWARE DETECTION MODEL

CROSS-REFERENCE TO RELATED APPLICATIONS

The present application claims the benefit of priority of U.S. Provisional Application No. 62/574,254 filed on Oct. 19, 2017, and Russian Patent Application No. 2017136618 filed Oct. 18, 2017, which are both herein incorporated by reference in their entirety.

FIELD OF TECHNOLOGY

The present disclosure generally relates to antivirus technologies, and more particularly to systems and methods for training a malware detection model.

BACKGROUND

The rapid development of computer technologies in the recent decade, as well as the widespread distribution of various computing devices (personal computers, notebooks, tablets, smartphones, etc.), have become a powerful impetus to the use of such devices in various spheres of activity and for an enormous number of problems (from Internet surfing to bank transfers and electronic document traffic). In parallel with the growth in the number of computing devices and the development of software running on these devices, the number of malicious programs has also increased at a rapid pace.

At present, there exists an enormous number of varieties of malicious programs. Some of them steal personal and confidential data from the users of these devices (such as logins and passwords, banking information, electronic documents). Others form so-called botnets from the devices of users for such attacks as denial of service (DDoS—Distributed Denial of Service) or to sort through passwords by the method of brute force on other computers or computer networks. Still others present paid content to users through intrusive advertising, paid subscriptions, the sending of SMS to toll numbers, and so on.

Specialized programs known as antiviruses are used in the struggle against malicious programs, including the detecting of malicious programs, the preventing of infection, and the restoration of the working capability of computing devices which have been infected with malicious programs. Antivirus programs employ various technologies to detect the full variety of malicious programs, such as:
 static analysis—the analysis of programs for harmfulness, including the running or emulating of the working of the programs being analyzed, on the basis of the data contained in files making up the programs being analyzed, whereby it is possible to use during statistical analysis:
  signature analysis—the searching for correspondences of a particular segment of code of the programs being analyzed to a known code (signature) from a database of signatures of malicious programs;
  white and black lists—the search for calculated check sums of the programs being analyzed (or portions thereof) in a database of check sums of malicious programs (black lists) or a database of check sums of safe programs (white lists);
 dynamic analysis—the analysis of programs for harmfulness on the basis of data obtained in the course of execution or emulation of the working of the programs being analyzed, whereby it is possible to use during dynamic analysis:
  heuristic analysis—the emulation of the working of the programs being analyzed, the creating of emulation logs (containing data on the calls of API functions, the parameters transmitted, the code segments of the programs being analyzed, and so on) and the search for correspondences between the data of the logs created and the data from a database of behavioral signatures of malicious programs;
  proactive protection—the intercepting of calls of API functions of the launched programs being analyzed, the creating of logs of the behavior of the programs being analyzed (containing data on the calls of API functions, the parameters transmitted, the code segments of the programs being analyzed, and so on) and the search for correspondences between the data of the logs created and the data from a database of calls of malicious programs.

Both static and dynamic analysis have their pluses and minuses. Static analysis is less demanding of resources of the computing device on which the analysis is being done, and since it does not require the execution or the emulation of the program being analyzed, statistical analysis is more productive in terms of speed at which the analysis is done, but at the same time less effective in terms of the quality of the analysis done, i.e., it has a lower percentage of detection of malicious programs and a higher percentage of false alarms (i.e., pronouncing a verdict that a file analyzed by the means of the antivirus program is malicious, whereas it is safe). Dynamic analysis, since it uses data obtained during the execution or emulation of the working of the program being analyzed, is less productive in terms of speed at which the analysis is done and makes higher demands on the resources of the computing device on which the analysis is being performed, but on the other hand it is also more effective in terms of the quality of the analysis done. Modern antivirus programs employ a comprehensive analysis, including elements of both static and dynamic analysis.

Since modern standards of computer security require an operative response to malicious programs (especially previously unknown ones), automatic means of detection of malicious programs are the main focus of attention. For the effective operation of such means, one often uses elements of artificial intelligence and various methods of machine learning of models for the detection of malicious programs (i.e., sets of rules for decision making as to the harmfulness of a file on the basis of a certain set of input data describing the malicious file), enabling an effective detection of not only well known malicious programs or malicious programs with well known malicious behavior, but also new malicious programs having unknown or little studied malicious behavior, as well as an operative adaptation (learning) to detect new malicious programs.

Although the known technology deals well with the detecting of malicious files having certain characteristic features (i.e., data describing certain features of files from a certain group of files, such as the presence of a graphic interface, data encryption, data transmission through a computer network, and so on), similar to the characteristic features of already known malicious files, it is often unable to detect malicious files having characteristic features different from the characteristic features of already known malicious files (albeit similar behavior).

SUMMARY

Disclosed are systems and methods for training a malware detection model.

According to one aspect, a method is provided that comprises generating, by a processor, a plurality of behavior patterns based on one or more logs of commands executed on a computing device, calculating, by the processor, an effectiveness of each of a plurality of methods for machine learning based on the plurality of behavior patterns, determining, by the processor, a preferred method for machine learning from the plurality of methods for machine learning by selecting the preferred method as a method with the greatest effectiveness from the plurality of methods for machine learning, obtaining, by the processor, parameters of the malware detection model by applying convolution functions to the plurality of behavior patterns, training, by the processor, the malware detection model to detect malicious files using the preferred method for machine learning.

In another aspect of the method, the preferred method is different from a previously selected preferred method that was used to train the detection model.

In another aspect, the method is further configured to applying the selected method for machine learning to a previously created detection model, wherein parameters of the previously created detection model are unable to produce output data with an accuracy higher than a predetermined threshold.

In another aspect of the method, the effectiveness is measured according to a number of errors when using the method for machine learning to detect malicious files based on the behavior patterns.

In another aspect of the method, the predetermined input data is of a particular kind, the particular kind one of: a data structure, a number of elements of the behavior pattern, performance of the computing device, available resources of the computing device.

In another aspect, the method further comprises selecting the method for machine learning according to one or more of: cross testing, mathematical validation of the criteria, split testing and stacking.

In another aspect, the method further comprises determining the preferred method by selecting an artificial neural network as the preferred method when the effectiveness is greater than a random forest as the preferred method, otherwise selecting the random forest as the preferred method, initializing a method of numerical optimization of parameters of the artificial neural network when the artificial neural network is selected and initializing a separating criterion for nodes in the random forest when the random forest is selected.

In another aspect, the method further comprises selecting the random forest as the method for machine learning when the computing device performance is below a predetermined threshold, otherwise selecting the artificial neural networks as the method for machine learning.

Further, in one aspect, a system for training a malware detection model is provided, the system comprising a hardware processor configured to generate a plurality of behavior patterns based on one or more logs of commands executed on a computing device, calculate an effectiveness of each of a plurality of methods for machine learning based on the plurality of behavior patterns, determine a preferred method for machine learning from the plurality of methods for machine learning by selecting the preferred method as a method with the greatest effectiveness from the plurality of methods for machine learning, obtain parameters of the malware detection model by applying convolution functions to the plurality of behavior patterns, training the malware detection model to detect malicious files using the preferred method for machine learning.

Furthermore, in one aspect, a computer-readable medium is provided storing instructions thereon, which when executed perform a method for training a malware detection model, comprising: generating, by a processor, a plurality of behavior patterns based on one or more logs of commands executed on a computing device, calculating, by the processor, an effectiveness of each of a plurality of methods for machine learning based on the plurality of behavior patterns, determining, by the processor, a preferred method for machine learning from the plurality of methods for machine learning by selecting the preferred method as a method with the greatest effectiveness from the plurality of methods for machine learning, obtaining, by the processor, parameters of the malware detection model by applying convolution functions to the plurality of behavior patterns, training, by the processor, the malware detection model to detect malicious files using the preferred method for machine learning.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

DETAILED DESCRIPTION

Figure 1:
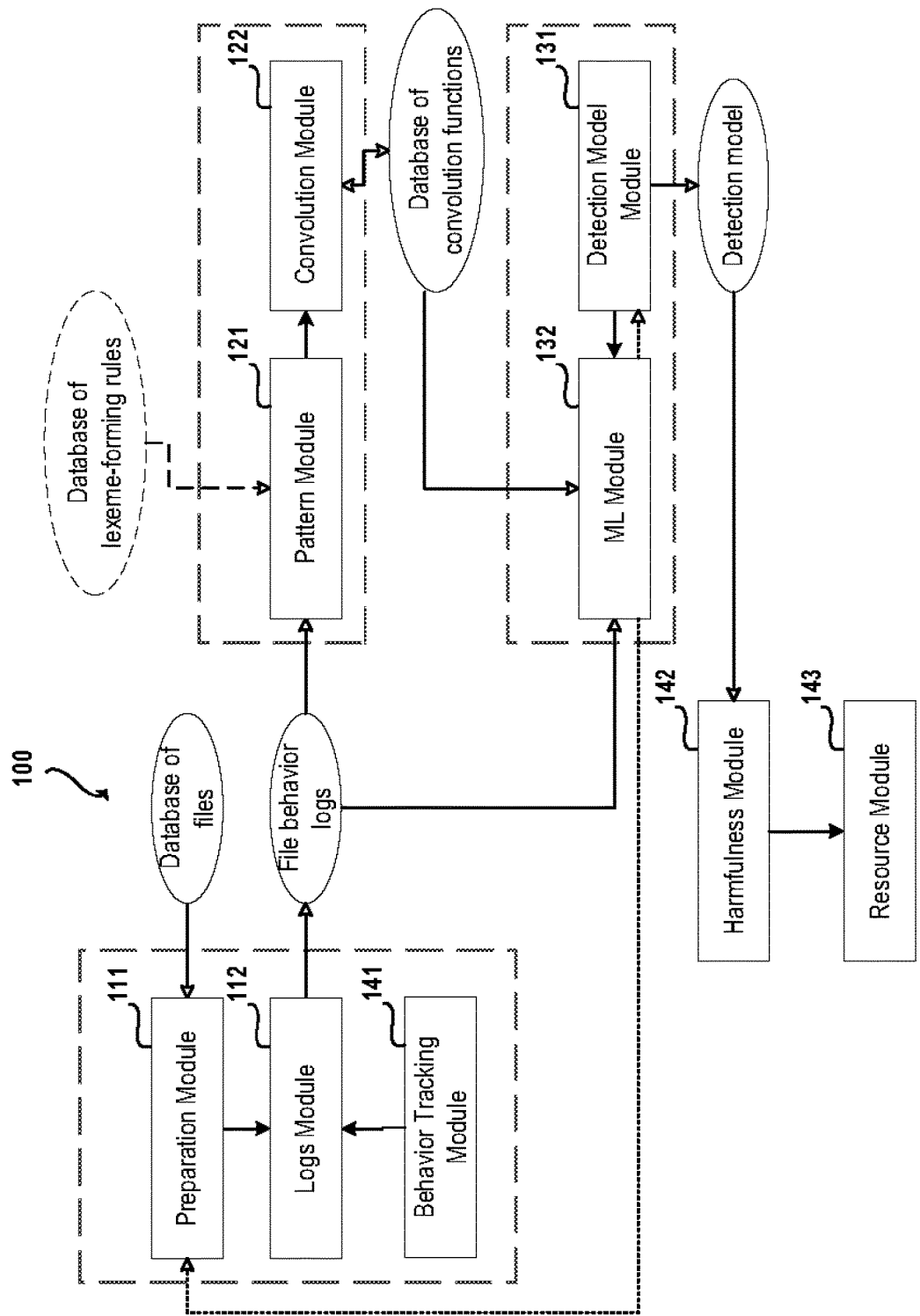
FIG. 1 is a block diagram of a system for detection of malicious files using machine learning in accordance with exemplary aspects of the present disclosure.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects.

The following terms will be used throught the disclosure, drawings and claims.

Malicious file—a file whose execution is known to be able to result in unauthorized destruction, blocking, modification, copying of computer information or neutralization of modules used for protection of computer information.

Malicious behavior of an executable file—a group of actions which may be performed during execution of that file and which are known to be able to result in unauthorized destruction, blocking, modification, copying of information or neutralization of the modules for protection of computer information.

Malicious activity of an executable file—a group of actions performed by that file in accordance with its malicious behavior.

Computing device of the average user—a hypothetical (theoretical) computing device having averaged characteristics of the computing devices of a previously selected group of users on which the same applications are executed as on the computing devices of those users.

Command executable by a computing device—a set of machine instructions or instructions of scripts executable by a computing device on the basis of the parameters of those instructions, known as command parameters or parameters describing said command.

Lexical analysis (tokenizing)—a process of analytical parsing of an input sequence of characters into recognized groups (hereafter: lexemes), in order to form at the output identification sequences (hereafter: tokens).

Token—an identification sequence formed from a lexeme in the process of lexical analysis.

FIG. 1 shows a block diagram of a system for detection of malicious files using machine learning in accordance with exemplary aspects of the present disclosure. The system 100 for machine learning consists of a preparation module 111 that is configured to prepare training selections, a logs module 112 that is configured to form behavior logs, a pattern module 121 that is configured to form behavior patterns, a convolution module 122 configured to form convolution functions, a detection model module 131 configured to create a detection module, a machine learning (ML) module 132 configured to perform machine learning of the detection model, a harmfulness module 142 configured to calculate a degree of harmfulness, and a resource module 143 configured to manage resources.

In one aspect, the system 100 has a client-server architecture, in which the preparation module 111, the logs module 112, the pattern module 121, the convolution module 122, the detection model module 131, and the ML module 132 work at the server side, and the pattern module 121, the harmfulness module 142 and the resource module 143 work on the client side.

For example, the client may be the computing devices of a user, such as a personal computer, notebook, smartphone, and so forth. The server may be the computing devices of an antivirus company, such as distributed systems of servers that perform a preliminary collection and antivirus analysis of files, a creation of antivirus records, and so forth. The system 100 may, in this aspect, be used to detect malicious files at the client side, thereby enhancing the effectiveness of the antivirus protection of that client.

In yet another example, both the client and the server may be the computing devices of the antivirus company alone, wherein the system 100 may be used for an automated antivirus analysis of files and creation of antivirus records, thereby enhancing the working effectiveness of the antivirus company.

According to one aspect, the preparation module 111 selects at least one file from a database of files. The preparation module 111 then transmits the selected files to the ML module 132 which trains the detection model on the basis of the selected files. Once the detection model is trained, or trained to a predetermined extent, the logs module 112 generates a behavior log which catalogues each of the commands executed by the selected files. The pattern module 121 formulates behavior patterns based on the behavior log. Once the behavior patterns are known, the convolution module 122 forms a convolution function from the behavior pattern, which in some instances is formed by calculating a feature vector of the behavior patterns. The detection model module 131 creates a detection model which is based off of parameters of the at least one file selected by the preparation module 111. After the detection model is created, the ML module 132 is configured to teach (or, in other words, train) the detection model by computing the parameters of the detection model using the convolution function from the convolution module 122. The ML module 132 trains the detection model on the files selected by the preparation module 111.

Ultimately, the detection model is used to compute the degree of harmfulness of file under analysis on the basis of the training and the behavior patterns. The detection module is then checked by the ML module 132 in order to determine whether the maliciousness determinations are accurate. The ML module 132 may, when it is determined that the detection module is improperly trained (i.e., that malicious files are not being detected as malicious) a retraining is performed by the ML module 132. When a file is under analysis for maliciousness, the harmfulness module 142 computes the degree of harmfulness of a file based on the behavior log and the trained detection model. Accordingly, the resource module 143 may allocate computing resources of the computer system to which the file under analysis belongs, to ensure the security of the computer system.

The preparation module 111 is designed to:
select at least one file from a database of files in accordance with predetermined rules of forming a learning selection of files, after which the ML module 132 will carry out the training of the detection model on the basis of an analysis of the selected files;
send the selected files to the logs module 112.

In one aspect of the system, at least one safe file and one malicious file are kept in the database of files.

For example, the database of files may keep, as safe files, the files of the operating system Windows, and as malicious files the files of backdoors, applications carrying out unauthorized access to data and remote control of an operating system and a computer as a whole. By training with the mentioned files and using methods of machine learning, the model for detection of malicious files will be able to detect malicious files having a functionality similar to the functionality of the aforementioned backdoors with high accuracy (the higher the accuracy the more files are used for the training of the aforementioned detection model).

In yet another aspect of the system, the database of files additionally keeps at least:
  suspicious files (riskware)—files which are not malicious, yet are able to carry out malicious actions;
  unknown files—files whose harmfulness has not been determined and remains unknown (i.e., files which are not safe, malicious, suspicious, and so forth).

For example, the database of files may have, as suspicious files, the files of applications for remote administration (such as RAdmin), archiving, or data encryption (such as WinZip), and so on.

In yet another aspect of the system, the database of files keeps at least files:
  collected by antivirus web crawlers;
  sent in by users.

The mentioned files are analyzed by antivirus experts, including with the help of automatic file analysis, in order to then pronounce a verdict as to the harmfulness of such files.

For example, the database of files may keep files sent in by users from their computing devices to the antivirus companies for a checking of their harmfulness, in which case the files transmitted may be either safe or malicious, and the distribution between the number of said safe and malicious files is close to the distribution between the number of all safe and malicious files located on the computing devices of said users (i.e., the ratio of the number of said safe files to the number of said malicious files differs from the ratio of the number of all safe files to the number of all malicious files located on the computing devices of said users by a quantity less than a specified threshold value $$\left| \frac{N_{clean}}{N_{malware}} - \frac{\forall\, N_{clean}}{\forall\, N_{malware}} \right| < \varepsilon \right).$$

Unlike the files transmitted by the users (i.e., files which are subjectively suspicious), the files collected by antivirus web crawlers which are designed to search for suspicious and malicious files more often prove to be malicious.

In yet another aspect of the system, at least one of the following conditions is used as the criteria for selecting files from the database of files:
  the distribution between safe and malicious files selected from the database of files corresponds to the distribution between safe and malicious files located on the computing device of the average user;
  the distribution between safe and malicious files selected from the database of files corresponds to the distribution between safe and malicious files collected with the help of antivirus web crawlers;
  the parameters of the files selected from the database of files correspond to the parameters of the files located on the computing device of the average user;
  the number of selected files corresponds to a predetermined value, while the files themselves are selected at random.

For example, the database of files contains 100000 files, among which 40% are safe files and 60% are malicious files. From the database of files there are selected 15000 files (15% of the total number of files being kept in the database of files) such that the distribution between the selected safe and malicious files corresponds to the distribution between the safe and malicious files located on the computing device of the average user and amounts to 95 to 5. For this purpose, 14250 safe files (35.63% of the total number of safe files) and 750 malicious files (1.25% of the total number of malicious files) are chosen at random from the database of files.

In yet another example, the database of files contains 1250000 files, of which 95% are safe files and 5% are malicious files, i.e., the distribution between the safe and malicious files being kept in the database of files corresponds to the distribution between the safe and malicious files located on the computing device of the average user. Of these files, 5000 files are chosen at random, of which ~4750 prove to be safe files and ~250 malicious files with a high probability.

In yet another aspect of the system, the file parameters are at least:
  the harmfulness of the file, characterizing whether the file is safe, malicious, potentially dangerous, or the behavior of the computing system when executing the file is not determined, and so forth;
  the number of commands performed by the computing device during the execution of the file;
  the size of the file;
  the applications utilizing the file.

For example, malicious files are chosen from the database of files which are scripts in the "ActionScript" language, executable by the application "Adobe Flash", and not exceeding 5 kb in size.

In yet another aspect of the system, the preparation module 111 is additionally designed to:
  select at least one other file from the database of files in accordance with predetermined rules of forming a test selection of files, after which the ML module 132 will carry out a verification of the trained detection model on the basis of an analysis of the selected files;
  send the selected files to the logs module 112.

For example, the database of files contains 75000 files, among which 20% are safe files and 80% are malicious files. First of all, 12500 files are chosen from the database of files, of which 30% are safe files and 70% are malicious files, after which the ML module 132 will perform a training of the detection model on the basis of an analysis of the selected files, and then 2500 files are selected from the remaining 62500 files, of which 60% are safe files and 40% are malicious files, and after this the ML module 132 will perform a checking of the trained detection model on the basis of an analysis of the selected files. The data formulated in the above-described way is called the cross-validation set of data.

The logs module 112 is designed to:
  intercept at least one executable command at least during:
    the execution of the file received,
    the emulation of the execution of the file received, wherein the emulation of the execution of the file includes the opening of the mentioned file (for example, the opening of a script by an interpreter);
  determine for each intercepted command at least one parameter describing said command;
  form the behavior log of the obtained file on the basis of the intercepted commands and the parameters so determined, wherein the behavior log constitutes the totality of intercepted commands (hereinafter, the command) from the file, where each command corresponds at least to one parameter so determined and describing that command (hereinafter, the parameter).

For example, the commands intercepted during the execution of a malicious file which collects passwords and transmits them via a computer network and the parameters calculated for said commands may look like:

```
CreateFile, 'c:\windows\system32\data.pass'
ReadFile, 0x14ea25f7, 0xf000
connect, http://stealpass.com
send, 0x14ea25f7, 0xf000
```

In one aspect of the system, the intercepting of commands from the file is done with the aid of at least:
 a specialized driver;
 a debugger;
 a hypervisor.

For example, the intercepting of commands during the execution of the file and the determination of their parameters is done with the aid of a driver which utilizes an interception by splicing of the entry point of a WinAPI function.

In yet another example, the intercepting of commands during the emulation of the working of a file is done directly by the emulator means performing said emulation, which determines the parameters of the command needing to be emulated.

In yet another example, the intercepting of commands during the execution of the file on a virtual machine is done by hypervisor means, which determines the parameters of the command needing to be emulated.

In yet another aspect of the system, the intercepted commands from the file are at least:
 API functions;
 sets of machine instructions describing a predetermined set of actions (macro commands).

For example, malicious programs very often perform a search for certain files and modify their attributes, for which they employ a sequence of commands such as:

```
FindFirstFile, 'c:\windows\system32\*.pass', 0x40afb86a
SetFileAttributes, 'c:\windows\system32\data.pass'
FindNextFile, 0x40afb86a
CloseHandle, 0x40afb86a ,
``` which may in turn be described by only a single command _change_attributes, 'c:\windows\system32\*.pass'

In yet another aspect of the system, each command is matched up with its unique identifier.

For example, all WinAPI functions may be matched up with numbers in the range of 0x0000 to 0x8000, where each WinAPI function corresponds to a unique number (for example, ReadFile→0x00f0, ReadFileEx→0x00f1, connect→0x03A2).

In yet another aspect of the system, several commands describing similar actions are matched up with a single identifier.

For example, all commands such as ReadFile, ReadFileEx, ifstream, getline, getchar and so forth, which describe a reading of data from a file, are matched up with an identifier _read_data_file (0x70F0).

The pattern module 121 is designed to:
 form at least one behavior pattern on the basis of the commands and parameters selected from the behavior log, wherein the behavior log constitutes the totality of executable commands (hereinafter, the command) from the file, where each command corresponds at least to one parameter describing that command (hereinafter, the parameter), the behavior pattern being a set of at least one command and such a parameter, which describes all of the commands of that set (hereinafter, the elements of the behavior pattern);
 send the behavior patterns so formed to the convolution module 122;

For example, from the behavior log the following commands $c_i$ and parameters $p_i$ are selected:
 $\{c_1, p_1, p_2, p_3\}$,
 $\{c_2, p_1, p_4\}$,
 $\{c_3, p_5\}$,
 $\{c_2, p_5\}$,
 $\{c_1, p_5, p_6\}$,
 $\{c_3, p_2\}$.

On the basis of the selected commands and parameters, behavior patterns are formed containing one command each and one parameter describing that command:
 $\{c_1, p_1\}$, $\{c_1, p_2\}$, $\{c_1, p_3\}$, $\{c_1, p_5\}$, $\{c_1, p_6\}$,
 $\{c_2, p_1\}$, $\{c_2, p_4\}$, $\{c_2, p_5\}$,
 $\{c_3, p_2\}$, $\{c_3, p_5\}$.

Next, on the basis of the patterns so formed, behavior patterns are formed in addition, containing one parameter each and all the commands which can be described by that parameter:
 $\{c_1, c_2, p_1\}$,
 $\{c_1, c_3, p_2\}$,
 $\{c_1, c_2, c_3, p_5\}$, After this, on the basis of the patterns so formed, behavior patterns are formed in addition, containing several parameters each and all the commands which can be described by those parameters at the same time:
 $\{c_1, c_2, p_1, p_5\}$.

In one aspect of the system, the commands and parameters are chosen from the behavior log on the basis of rules by which are selected at least:
 every i-th command in succession and the parameters describing it, the increment i being specified in advance;
 the commands executed after a predetermined period of time (for example, every tenth second) from the previous selected command, and describing their parameters;
 the commands and the parameters describing them that are executed in a predetermined time interval from the start of execution of the file;
 the commands from a predetermined list and the parameters describing them;
 the parameters from a predetermined list and the commands described by those parameters;
 the first or the random k parameters of commands in the case when the number of command parameters is greater than a predetermined threshold value.

For example, from the behavior log one selects all the commands for working with a hard disk (such as CreateFile, ReadFile, WriteFile, DeleteFile, GetFileAttribute and so on) and all the parameters describing the selected commands.

In yet another example, from the behavior log one selects every thousandth command and all the parameters describing the selected commands.

In one aspect of the system, the behavior logs are formed in advance from at least two files, one of which is a safe file and the other a malicious file.

In yet another aspect of the system, each element of the behavior log is matched up with a characteristic such as the type of element of the behavior pattern. The type of element of the behavior pattern (command or parameter) is at least:
 a "number range", if the element of the behavior pattern can be expressed as a number,
 for example, for an element of the behavior pattern constituting the parameter $port_{html}=80$ of the connect command, the type of said element of the behavior pattern may be the "number range from 0x0000 to 0xFFFF",
   a "string", if the element of the behavior pattern can be expressed in the form of a string,
for example, for an element of the behavior pattern constituting the connect command, the type of said element of the behavior pattern may be a "string less than 32 characters in size",
   if the element of the behavior pattern can be expressed in the form of data described by a predetermined data structure, the type of that element of the behavior pattern may be a "data structure",
   for example, for an element of a behavior pattern constituting the parameter src=0x336b9a480d490982cdd93e2e49fdeca7 of the find_record command, the type of this element of the behavior pattern may be the "data structure MD5".

In yet another aspect of the system, the behavior pattern additionally includes, as elements of the behavior pattern, tokens formed on the basis of lexical analysis of said elements of the behavior pattern with the use of at least:
   predetermined rules for the formation of lexemes,
   a previously trained recurrent neural network.
For example, with the aid of lexical analysis of the parameter
   'c:\windows\system32\data.pass'
on the basis of the rules for the formation of lexemes:
   if the string contains the path to a file, determine the disk on which the file is located;
   if the string contains the path to a file, determine the folders in which the file is located;
   if the string contains the path to a file, determine the file extension;
where the lexemes are:
   the paths to the file;
   the folders in which the files are located;
   the names of the files;
   the extensions of the files;
   the tokens can be formed:

---

"paths to the file" →
   'c:\',
"folders in which the files are located" →
   'windows',
   'system32',
   'windows\system32',
"extensions of the files" →
   '.pass'.

---

In yet another example, with the aid of lexical analysis of the parameters
   '81.19.82.8', '81.19.72.38', '81.19.14.32'
on the basis of the rule for the formation of lexemes:
   if the parameters constitute IP addresses, determine the bit mask (or its analog, expressed by metacharacters) describing said IP addresses (i.e., the bit mask M for which the equality M/\IP=const is true for all said IPs);
   the token can be formulated:
   '81.19.*.*'.
      In yet another example, from all available parameters comprising numbers, the tokens of the numbers are formed in predetermined ranges: 23, 16, 7224, 6125152186, 512, 2662162, 363627632, 737382, 52, 2625, 3732, 812, 3671, 80. 3200 sorting is done by ranges of numbers:
   from 0 to 999
      →{16, 23, 52, 80. 512, 812},
   from 1000 to 9999
      →{2625, 3200. 3671, 7224},
   from 10000 on
      →{737382, 2662162, 363627632, 6125152186}
   In yet another aspect of the system, tokens are formed from elements of a behavior pattern which consist of strings.
   For example, the behavior pattern is a path to a file containing the names of the disk, the directories, the files, the file extensions, and so forth. In this case, the token may be the name of the disk and the file extension.

---

C:\Windows\System32\drivers\acpi.sys
→
C:\
*.sys

---

The convolution module 122 is designed to:
   form a convolution function from the behavior pattern such that the result of the inverse convolution function of the result of that convolution function performed on the obtained behavior pattern will have a degree of similarity with the obtained behavior pattern greater than a specified value, i.e $$r \sim g^{-1}(g(r))$$

where:
   $r_i$ is the behavior pattern,
   g is the convolution function,
   $g^{-1}$ is the inverse convolution function.
   send the convolution function so formed to the ML module 132.
In one aspect of the system, the convolution module is additionally designed to:
   calculate the feature vector of a behavior pattern on the basis of the obtained behavior pattern, wherein the feature vector of the behavior pattern may be expressed as the sum of the hash sums of the elements of the behavior pattern;
   form a convolution function from the feature vector of the behavior pattern, where the convolution function constitutes a hash function such that the degree of similarity of the calculated feature vector and the result of the inverse hash function of the result of that hash function from the calculated feature vector is greater than a predetermined value.
   In yet another aspect of the system, the convolution function is formed by the metric learning method. In this aspect, a distance is computed between the convolutions obtained with the aid of said convolution function for behavior patterns having a degree of similarity greater than a predetermined similarity threshold value. The computed distance is less than a predetermined distance threshold value. However, for behavior patterns having a degree of similarity less than the predetermined similarity threshold value, the computed distance is greater than the predetermined distance threshold value.
   For example, the feature vector of the behavior pattern may be calculated as follows:
      first an empty bit vector is created, consisting of 100000 elements (where one bit of information is reserved for each element of the vector);
      1000 elements from the behavior pattern r are set aside for storing of data about the commands $c_i$, the remaining 99000 elements are set aside for the parameters $c_i$ of the behavior pattern r, wherein 50000 elements (from element 1001 to element 51000) are set aside for string parameters and 25000 elements (from element 51001 to element 76000) for number parameters;

each command $c_i$ of the behavior pattern r is matched up with a certain number $x_i$ from 0 to 999, and the corresponding bit is set in the vector so created $v[x_i]$=true;

for each parameter $p_i$ of the behavior pattern r the hash sum is calculated by the formula:
for strings: $y_i$=1001+crc32($p_i$) (mod 50000)
for numbers: $y_i$=51001+crc32($p_i$) (mod 25000)
for the rest: $y_i$=76001+crc32($p_i$) (mod 24000),
and depending on the calculated hash sum the corresponding bit is set in the created vector $v[y_i]$=true;

The described bit vector with the elements so set constitutes the feature vector of the behavior pattern r.

In yet another aspect of the system, the feature vector of the behavior pattern is computed by the following formula:

$$D = \sum_i b^i \times h(r_i)$$

where:
b is the base of the positional system of computation (for example, for a binary vector b=2, for a vector representing a string, i.e., a group of characters, b=8),
$r_i$ is the i-th element of the behavior pattern,
h is the hash function, where $0 \leq h(r_i) < b$.

For example, the feature vector of the behavior pattern may be computed as follows:
first create yet another empty bit vector (different from the previous example), consisting of 1000 elements (where one bit of information is reserved for each element of the vector);
calculate the hash sum for each pattern element $r_i$ of the behavior pattern r by the formula:

$x_i = 2^{crc32(r_i)(mod\ 1000)}$, and depending on the computed hash sum, set the corresponding bit in the created vector $v[x_i]$=true;

In yet another aspect of the system, the feature vector of the behavior pattern constitutes a Bloom filter.

For example, the feature vector of the behavior pattern may be computed as follows:
first create yet another empty vector (different from the previous examples), consisting of 100000 elements;
calculate at least two hash sums for each pattern element $r_i$ of the behavior pattern r by means of a set of hash functions $\{h_j\}$ by the formula:

$x_{ij} = h_j(r_i)$ where:

$h_j(r_i) = crc32(r_i)$, $h_j(0) = const_j$, and depending on the computed hash sums, set the corresponding elements in the created vector $v[x_{ij}]$=true.

In yet another aspect of the system, the size of the result of the formulated convolution function of the feature vector of the behavior pattern is less than the size of said feature vector of the behavior pattern.

For example, the feature vector constitutes a bit vector containing 100000 elements, and thus having a size of 12500 bytes, while the result of the convolution function of said feature vector constitutes a set of 8 MD5 hash sums and thus has a size of 256 bytes, i.e., ~2% of the size of the feature vector.

In yet another aspect of the system, the degree of similarity of the feature vector and the result of the inverse hash function of the result of said hash function of the calculated feature vector constitutes a number value in the range of 0 to 1 and is calculated by the formula:

$$w = \frac{\sum (\{h(r_i)\} \wedge \{g_i\})}{\sum \{h(r_i)\}}$$

$\{h(r_i)\} \wedge \{g_i\} \forall \{h(r_i)\} = \{g_i\}$ where:
$h(r_i) \wedge g_i$ signifies the congruence of $h(r_i)$ with $g_i$ and
$\{h(r_i)\}$ is the set of results of the hash functions of the elements of the behavior pattern,
$\{g_i\}$ is the set of results of the inverse hash function of the result of the hash function of the elements of the behavior pattern,
$r_i$ is the i-th element of the behavior pattern,
h is the hash function,
w is the degree of similarity.

For example, the calculated feature vector constitutes the bit vector
101011100110010010110111011111101000010000110
010010010011101011011
010100011001101101001000100000001011101111
0011011011,
the result of the convolution function of this feature vector is
1010011110101110101,
and the result of the inverse convolution function of the above-obtained result is
101011100110001001011011100111110100010000110
010010100011101011011
011100011001101101000000010000000101110111
0011011011
(where the bolding denotes elements different from the feature vector). Thus, the similarity of the feature vector and the result of the inverse convolution function is 0.92.

In yet another aspect of the system, the aforementioned hash function using an element of the behavior pattern as a parameter depends on the type of element of the behavior pattern:

$h(r_i) = h_{r_i}(r_i)$.

For example, in order to compute the hash sum of a parameter from the behavior pattern constituting a string containing the path to the file, the hash function CRC32 may be used; for any other string—the Hoffman algorithm; for a data set—the hash function MD5.

In yet another aspect of the system, the forming of the convolution function of the feature vector of a behavior pattern is done by an autoencoder, where the input data are the elements of that feature vector of the behavior pattern, and the output data are data having a coefficient of similarity to the input data greater than a predetermined threshold value.

The detection model module 131 is designed to:
create a detection model for malicious files, including at least:
  selection of a method for machine learning of the detection model;
  initialization of the parameters of the training model, where the parameters of the training model initialized prior to the start of the machine learning of the detection model are known as hyperparameters;

In one aspect, the detection model is dependent on the parameters of the files selected by the preparation module 111; According to another aspect, the detection model is fixed and does not dependent on parameters of the training model. In yet another aspect, each model disclosed herein, including the detection model, the training model and the like may depend on incoming files from the preparation module 111, parameters of the method for machine learning of the detection model and model parameters received for verification.

send the training model so created to the ML module 132.

According to one aspect, the detection model may be formed according to a method, and then used by the preparation module 111 to generate a behavior log based on the database of files. Under real-time conditions, the training model is then retrained based on the determined severity of the files, using the machine learning module 132. In another aspect, the detection model may be formed and trained using the preparation module 11 based on files from the database of files. In this approach, the detection model can be finely tuned prior to operation of the system described herein, operating on files in a deployed production environment. In yet another aspect, the described system operates using a single file as a training sample file and a file that may require an anti-virus scan. In this aspect, there is no accumulation or replenishment of behavior logs so that the detection model is not built on the basis of previously typed statistics of files, but the detection model adjusts for each file separately.

For example, when selecting the method for machine learning of the detection model, at first a decision is made whether to use as the detection model an artificial neural net or a random forest, and then if a random forest is chosen one selects the separating criterion for the nodes of the random forest; or if an artificial neural net is chosen, one selects the method of numerical optimization of the parameters of the artificial neural net. The decision as to the choice of a particular method for machine learning is made on the basis of the effectiveness of that method in the detecting of malicious files (i.e., the number of errors of the first and second kind occurring in the detecting of malicious files) with the use of input data (behavior patterns) of a predetermined kind (i.e., the data structure, the number of elements of the behavior patterns, the performance of the computing device on which the search is conducted for malicious files, the available resources of the computing device, and so on).

In yet another example, the method for machine learning of the detection model is selected on the basis of at least:
  cross testing, sliding check, cross-validation (CV);
  mathematical validation of the criteria AIC, BIC and so on;
  A/B testing, split testing;
  stacking.

In yet another example, in the event of the computing device performance being below a predetermined threshold, random forests are chosen, otherwise the artificial neural net is chosen.

In one aspect of the system, machine learning is performed for a previously created untrained detection model (i.e., a detection model in which the parameters of that model cannot produce, on the basis of analysis of the input data, output data with accuracy higher than a predetermined threshold value).

In yet another aspect of the system, the method for machine learning of the detection model is at least:
  decision-tree-based gradient boosting;
  decision trees;
  the K-nearest neighbor method;
  the support vector machine (SVM) method.

In yet another aspect of the system, the detection model module 131 is additionally designed to create a detection model on demand from the ML module 132, where certain hyperparameters and methods of machine learning are chosen to be different from the hyperparameters and machine learning methods chosen for a previous detection model.

The ML module 132 is designed to train the detection model, in which the parameters of the detection model are computed with the use of the obtained convolution function on the obtained behavior patterns, where the detection model constitutes a set of rules for computing the degree of harmfulness of a file on the basis of at least one behavior pattern with the use of the computed parameters of said detection model.

For example, the detection model is trained with a known set of files selected by the preparation module 111, wherein said set of files contains 60% safe files and 40% malicious files.

In one aspect of the system, the degree of harmfulness of a file constitutes a numerical value from 0 to 1, where 0 means that said file is safe, and 1 that it is malicious.

In yet another aspect of the system, a method of training of the detection model is chosen which ensures a monotonic change in the degree of harmfulness of a file dependent on the change in the number of behavior patterns formed on the basis of analysis of the behavior log.

For example, a monotonic change in the degree of harmfulness of a file means that, upon analyzing each subsequent behavior pattern, the calculated degree of harmfulness will be not less than the previously calculated degree of harmfulness (for example, after analysis of the 10th behavior pattern, the calculated degree of harmfulness is equal to 0.2; after analysis of the 50th behavior pattern, it is 0.4; and after analysis of the 100th behavior pattern, it is 0.7).

In yet another aspect of the system, the ML module 132 is additionally designed to:
  perform a check of the trained detection model on the obtained behavior logs formed on the basis of analysis of files from a test selection of files, in order to determine the correct determination of the harmfulness of files from the test selection of files;
  in the event of a negative result of the check, send a request at least:
    to the preparation module 111 to prepare a selection of files different from the current one used for the training of the detection model;
    to the detection model module 131 to create a new detection model, different from the current one.

The checking of the trained detection model involves the following. Said detection model has been taught on the basis of a set of files selected by the preparation module 111 for which it was known whether they are safe or malicious. In order to verify that the model for detection of malicious files has been trained correctly, i.e., that detection model is able to detect malicious files and pass over safe files, a checking of this model is performed. For this purpose, said detection model is used to determine whether files from another set of files selected by the preparation module 111 are malicious, it being known in advance whether those files are malicious. Thus, one determines how many malicious files were "missed" and how many safe files were detected. If the number of missed malicious files and detected safe files is greater than a predetermined threshold value, that detection model is considered to be improperly trained and a repeat machine learning needs to be done for it (for example, on another training selection of files, using values of the parameters of the detection model different from the previous ones, and so forth).

For example, when performing the checking of the trained model one checks the number of errors of the first and second kind in the detecting of malicious files from a test selection of files. If the number of such errors is greater than a predetermined threshold value, a new training and testing selection of files is selected and a new detection model is created.

In yet another example, the training selection of files contained 10000 files, of which 8500 were malicious and 1500 were safe. After the detection model was taught, it was checked on a test selection of files containing 1200 files, of which 350 were malicious and 850 were safe. According to the results of the check performed, 15 out of 350 malicious files failed detection (4%), while 102 out of 850 safe files (12%) were erroneously considered to be malicious. In the event that the number of undetected malicious files exceeds 5% or accidentally detected safe files exceeds 0.1%, the trained detection model is considered to be improperly trained.

In one aspect of the system, the behavior log of the system is additionally formed on the basis of a previously formed behavior log of the system and commands intercepted after the forming of said behavior log of the system.

For example, after the start of the execution of a file for which it is necessary to pronounce a verdict as to the harmfulness or safety of that file, the intercepted executable commands and the parameters describing them are recorded in the behavior log. On the basis of an analysis of these commands and parameters, the degree of harmfulness of that file is calculated. If no verdict was pronounced as to the file being malicious or safe based on the results of the analysis, the intercepting of commands may be continued. The intercepted commands and the parameters describing them are recorded in the old behavior log or in a new behavior log. In the first case, the degree of harmfulness is calculated on the basis of an analysis of all commands and parameters recorded in the behavior log, i.e., even those previously used to calculate the degree of harmfulness.

The harmfulness module 142 is designed to:
calculate the degree of harmfulness on the basis of the behavior log obtained from the logs module 112 and the detection model obtained from the ML module 132, the degree of harmfulness of a file being a quantitative characteristic (for example, lying in the range from 0—the file has only safe behavior—to 1—said file has predetermined malicious behavior), describing the malicious behavior of the executable file;
send the calculated degree of harmfulness to the resource module 143.

The resource module 143 is designed to allocate computing resources of the computer system on the basis of the analysis of the obtained degree of harmfulness for use in assuring the security of the computer system.

In one aspect of the system, the computing resources of the computer system include at least:
the volume of free RAM;
the volume of free space on the hard disks;
the free processor time (quanta of processor time) which can be spent on the antivirus scan (for example, with a greater depth of emulation).

In yet another aspect of the system, the analysis of the degree of harmfulness consists in determining the dynamics of the change in the value of the degree of harmfulness after each of the preceding calculations of the degree of harmfulness and at least:
allocating additional resources of the computer system in the event of an increase in the value of the degree of harmfulness;
freeing up previously allocated resources of the computer system in the event of a decrease in the value of the degree of harmfulness.

Figure 2:
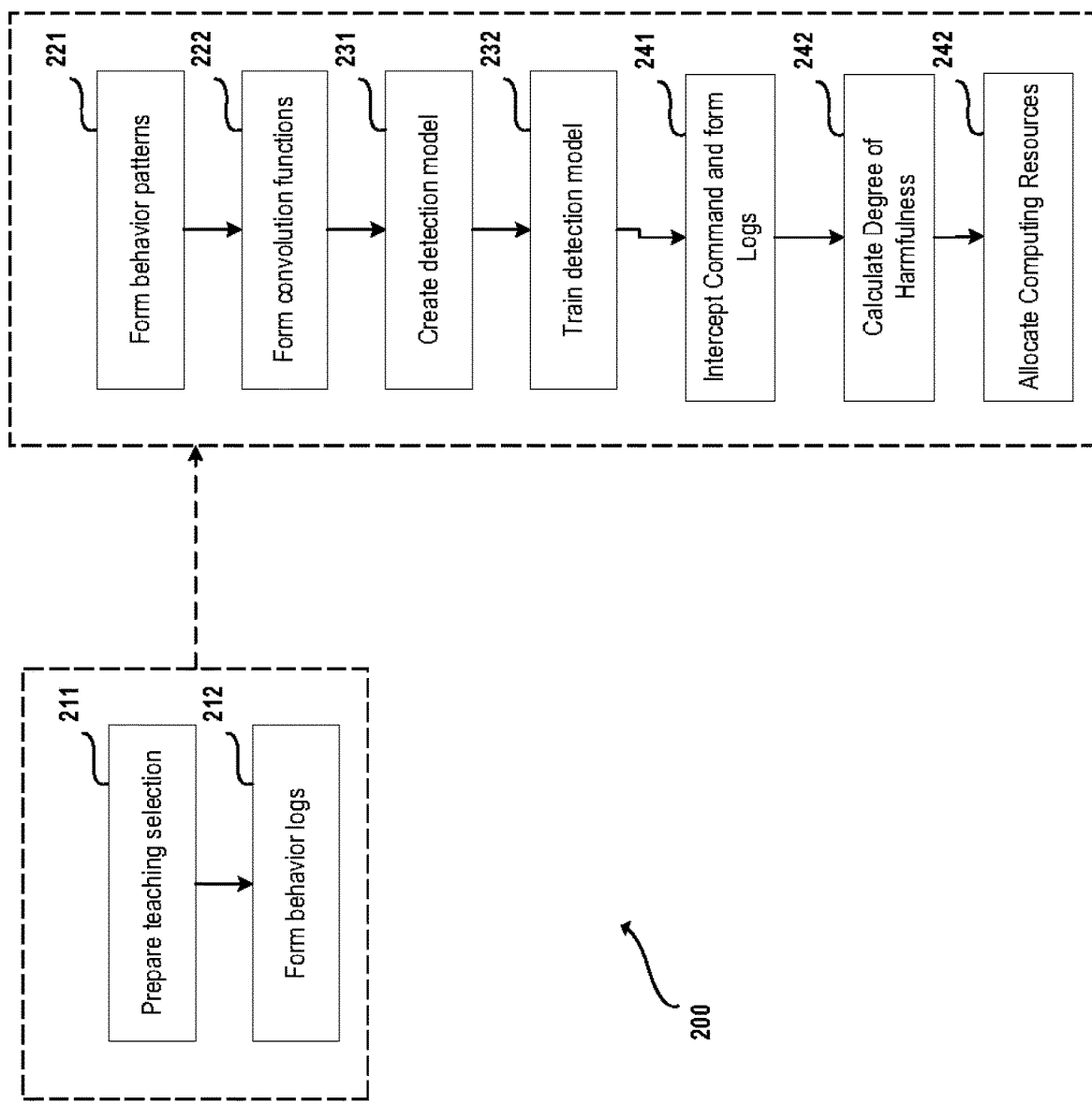
FIG. 2 is a flowchart of a method for detection of malicious files using machine learning in accordance with an exemplary aspect of the present disclosure.

FIG. 2 is a flowchart of a method for detection of malicious files using machine learning in accordance with an exemplary aspect of the present disclosure. The method 200 may be implemented on the system 100. Briefly, the method 200 comprises: at step 211, training selections of files are prepared; at step 212, behavior logs are formed; at step 221, behavior patterns are formed; at step 222, convolution functions are formed; at step 231, a detection model is created; at step 232, the detection model is trained; at step 241, the behavior of the computer system is tracked; at step 242, the degree of harmfulness is calculated; and at step 243, the resources of the computer system are managed.

More specifically, in step 211, the preparation module 111 is used to select at least one file from a database of files according to predetermined criteria, wherein the training of the detection model will be done in step 232 on the basis of the selected files.

In step 212, the logs module 112 is used:
to intercept at least one command at least during:
the execution of the file selected in step 211,
the emulation of the working of the file selected in step 211;
to determine for each intercepted command at least one parameter describing that command;
to form, on the basis of the commands intercepted and the parameters determined, a behavior log of the obtained file, wherein the behavior log represents a set of intercepted commands (hereinafter, the command) from the file, where each command corresponds to at least one defined parameter describing that command (hereinafter, the parameter).

In step 221, the pattern module 121 is used to form at least one behavior pattern on the basis of the commands and parameters selected from the behavior log formed in step 212, where the behavior log represents the group of executable commands (hereinafter, the command) from the file, where each command corresponds to at least one parameter describing that command (hereinafter, the parameter), the behavior pattern being a set of at least one command and such a parameter, which describes all the commands from that set.

In step 222, the convolution module 122 is used to form a convolution function of the behavior pattern formed in step 221 so that the result of the inverse convolution function of the result of this convolution function performed on the aforementioned behavior pattern will have a degree of similarity to the aforementioned behavior pattern greater than a specified value.

In step 231, the detection model module 131 is used to create a detection model, for which at least:
- a method for machine learning of a detection model is selected;
- the parameters of the training model are initialized, where the parameters of the training model initialized prior to the start of the machine learning of the detection model are known as hyperparameters, dependent on the parameters of the files selected in step 211.

In step 232, the ML module 132 is used to train the detection model created in step 231, in which the parameters of that detection model are calculated with the use of the convolution function formed in step 222, on the behavior patterns formed in step 221, where the detection model where the detection model constitutes a group of rules for calculating the degree of harmfulness of a file on the basis of at least one behavior pattern with the use of the calculated parameters of that detection model.

In step 241, a behavior tracking module 141 is used:
- to intercept at least one command being executed by the files running in the computer system;
- to form a behavior log of the system on the basis of the intercepted commands.

In step 242, the harmfulness module 142 is used to calculate the degree of harmfulness on the basis of the behavior log of the system, formed in step 241, and the detection model which has been trained in step 232.

In step 243, the resource module 143 is used to allocate computing resources on the basis of the analysis of the degree of harmfulness as calculated in step 242 for use in assuring the security of the computer system.

Figure 3:
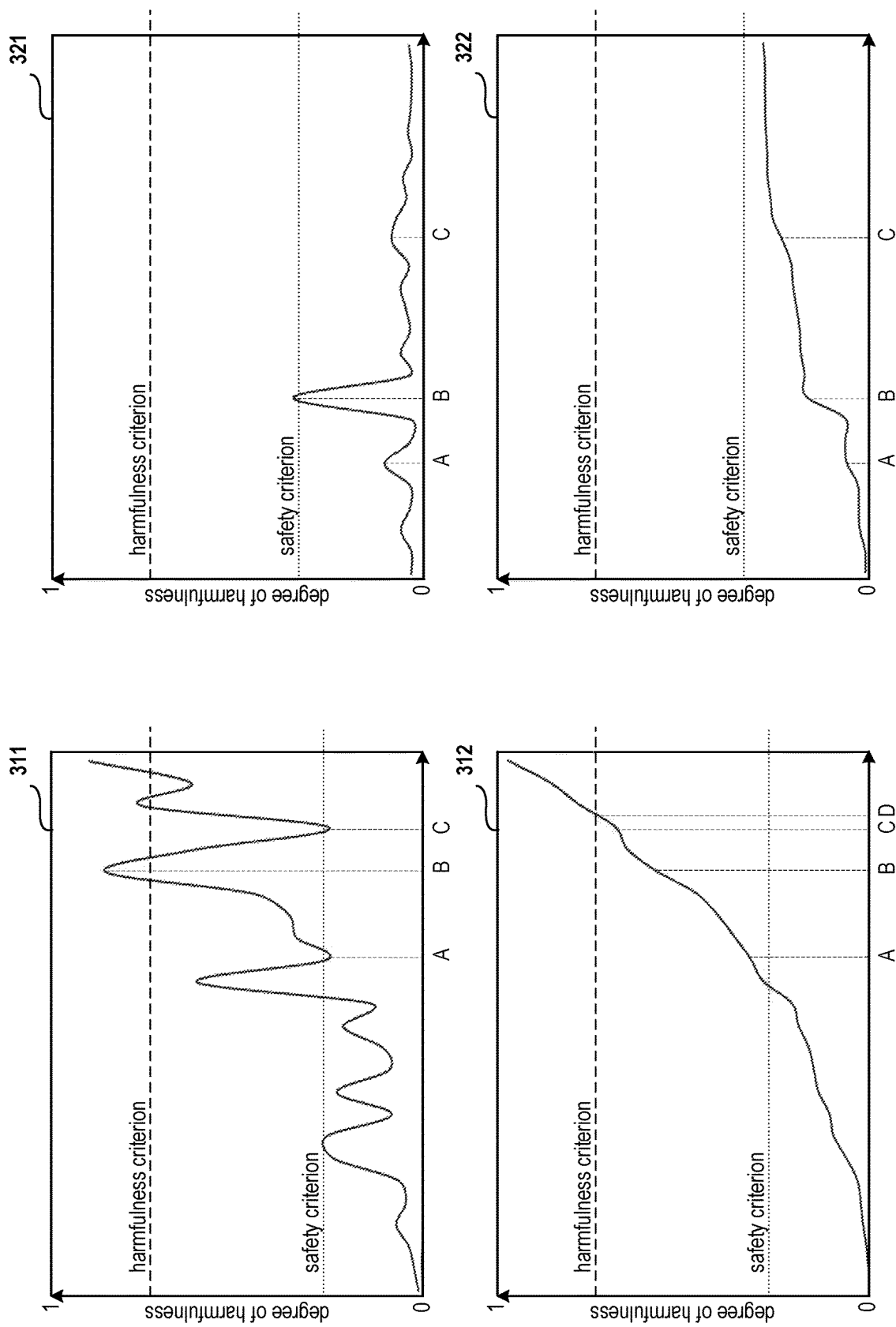
FIG. 3 shows examples of the dynamics of change in the degree of harmfulness as a function of the number of behavior patterns in accordance with exemplary aspects of the present disclosure.

FIG. 3 shows examples of the dynamics of change in the degree of harmfulness as a function of the number of behavior patterns in accordance with exemplary aspects of the present disclosure.

The examples of the dynamics of change in the degree of harmfulness as a function of the number of behavior patterns contain a graph 311 which plot the dynamics of an arbitrary change in the degree of harmfulness as a function of the number of behavior patterns formed during the execution of a malicious file. FIG. 3 also shows a graph 312 of the dynamics of monotonic change in the degree of harmfulness as a function of the number of behavior patterns formed during the execution of a malicious file. Graph 321 plots the dynamics of an arbitrary change in the degree of harmfulness as a function of the number of behavior patterns formed during the execution of a safe file. Finally, graph 322 plots the dynamics of monotonic change in the degree of harmfulness as a function of the number of behavior patterns formed during the execution of a safe file.

In one aspect of the system, the degree of harmfulness of an executable file takes on a value in the range of 0 (said file has absolutely safe behavior) to 1 (said file has predetermined malicious behavior).

The graph 311 shows the dynamics of an arbitrary change in the degree of harmfulness as a function of the number of behavior patterns formed during the execution of a malicious file.

In the beginning, upon executing said file, the number of behavior patterns formed is not large, and, additionally, the malicious activity of the executable file might be absent or minimal (for example, an initialization of data occurs, which is natural to many files, including safe ones). Thus initially, the calculated degree of harmfulness differs slightly from 0 and does not exceed the predetermined threshold value (hereinafter, the criterion of safety). After the degree of harmfulness exceeds the threshold value, the behavior of the executable file ceases to be considered safe (on the graph, this threshold value is designated by a broken line).

However, in time the malicious activity of the executable file grows and the degree of harmfulness may begins to approach 1, surpassing the criterion of safety, while the degree of harmfulness might not reach the predetermined threshold value (hereinafter, the criterion of harmfulness) after the passing of which the behavior of the executable file will be considered to be malicious (in the graph, this threshold value is designated by a dashed line).

After a period of growth, the malicious activity may cease and the degree of harmfulness will again tend toward 0 (time A). At a certain time, the degree of harmfulness will become greater than the criterion of harmfulness (time B) and the behavior of the executable file will be recognized as malicious and consequently the file being analyzed will be recognized as malicious.

The time of recognizing the file as malicious might occur significantly later than the start of growth in malicious activity, since the described approach responds well to an abrupt growth in the degree of harmfulness, which occurs most often during prolonged, clearly manifested malicious activity of the executable file.

In the event that the malicious activity occurs episodically (left side of the graph 311), the calculated degree of harmfulness might not reach the value after which a verdict is pronounced as to the harmfulness of the behavior of the executable file, and consequently the harmfulness of the executable file itself.

In the case when the degree of harmfulness is not calculated on the basis of each behavior pattern formed (for example, because the performance of the computing device is not high), a situation is possible where the degree of harmfulness will be calculated at time A (when the malicious activity commences) and time C (when the malicious activity is finished), but will not be calculated at time B (when malicious activity is occurring). So the calculated degrees of harmfulness will not exceed the criterion of harmfulness, the activity of the executable file will not be recognized as malicious, and consequently the malicious file will not be detected.

The graph 312 shows the dynamics of monotonic change in the degree of harmfulness as a function of the number of behavior patterns formed during the execution of a malicious file.

In the beginning, upon executing said file, the number of behavior patterns formed is not large, and the malicious activity of the executable file might be absent or minimal (for example, an initialization of data occurs, which is natural for many files, including safe ones). Consequently, the calculated degree of harmfulness differs little from 0 and does not exceed the predetermined threshold value (hereinafter, the criterion of safety). As has been described above, the criterion of safety is a value which, if exceeded, indicates that the behavior of the executable file ceases to be considered safe (on the graph, this threshold value is designated by a broken line).

However, in time the malicious activity of the executable file grows and the degree of harmfulness begins to approach 1, surpassing the criterion of safety, while the degree of harmfulness might not reach the predetermined threshold value (hereinafter, the criterion of harmfulness) after the passing of which the behavior of the executable file will be considered to be malicious (in the graph, this threshold value is designated by a dashed line).

After a period of growth (times A-B), the malicious activity may cease (times B-A) yet the degree of harmfulness will not decline, but only continue to grow during any malicious activity of the executable file. At a certain time, the degree of harmfulness will become greater than the criterion of harmfulness (time D) and the behavior of the executable file will be recognized as malicious. Consequently the file itself will be recognized as malicious.

The time of recognizing the file as malicious might occur immediately after the manifesting of malicious activity, since the described approach responds well to a smooth growth in the degree of harmfulness, which occurs both during prolonged, clearly manifested malicious activity of the executable file, and during frequent, episodic, less-pronounced malicious activity.

In the event that the malicious activity occurs episodically (left side of the graph 312), the calculated degree of harmfulness over time might reach the value after which a verdict is pronounced as to the harmfulness of the behavior of the executable file and the harmfulness of the executable file itself.

In the case when the degree of harmfulness is not calculated on the basis of each behavior pattern formed (for example, because the performance of the computing device is not high), a situation is possible where the degree of harmfulness will be calculated at time A (when the malicious activity commences) and time C (when the malicious activity is finished), but will not be calculated at time B (when malicious activity is occurring); nevertheless, since the degree of harmfulness changes monotonically, the calculated degrees of harmfulness will only increase their values and at time C the degree of harmfulness will exceed the criterion of harmfulness, the activity of the executable file will be recognized as malicious, and consequently the malicious file will be detected.

The graph 321 shows the dynamics of an arbitrary change in the degree of harmfulness as a function of the number of behavior patterns formed during the execution of a safe file.

In the beginning, upon executing said file, the number of behavior patterns formed is not large, and what is more there is no malicious activity as such for the executable file, although "suspicious" commands might be executed, which may also be performed during the execution of malicious files (for example, deletion of files, transfer of data in a computer network, and so on), therefore the calculated degree of harmfulness differs from 0 and does not exceed the predetermined threshold value (hereinafter, the criterion of safety), after passing which the behavior of the executable file ceases to be considered safe (on the graph, this threshold value is designated by a broken line).

However, in time the malicious activity of the executable file grows on account of the execution of a large number of "suspicious" commands and the degree of harmfulness begins to approach 1, while the degree of harmfulness might not reach the predetermined threshold value (hereinafter, the criterion of harmfulness) after the passing of which the behavior of the executable file will be considered to be malicious (in the graph, this threshold value is designated by a dashed line), but it might exceed the criterion of safety, so that the file may cease to be considered safe and become "suspicious".

After a period of growth, the malicious activity may cease and the degree of harmfulness will again tend toward 0 (time C).

In the case when the degree of harmfulness is not calculated on the basis of each behavior pattern formed (for example, because the performance of the computing device is not high), a situation is possible where the degree of harmfulness will be calculated at time B (when the activity is most similar to malicious, i.e., becomes "suspicious") but will not be calculated at time A (when the "suspicious" activity increases) or at time C (when the "suspicious" activity is decreasing), so that the calculated degree of harmfulness will exceed the criterion of safety, the activity of the executable file will be recognized as "suspicious" (it will not be considered safe), and consequently the safe file will not be recognized as safe.

The graph 322 shows the dynamics of monotonic change in the degree of harmfulness as a function of the number of behavior patterns formed during the execution of a safe file.

In the beginning, upon executing said file, the number of behavior patterns formed is not large, and what is more there is no malicious activity as such for the executable file, although "suspicious" commands might be executed, which may also be performed during the execution of malicious files (for example, deletion of files, transfer of data in a computer network, and so on), therefore the calculated degree of harmfulness differs from 0 and does not exceed the predetermined threshold value (hereinafter, the criterion of safety), after passing which the behavior of the executable file ceases to be considered safe (on the graph, this threshold value is designated by a broken line).

However, in time the malicious activity of the executable file grows on account of the execution of a large number of "suspicious" commands and the degree of harmfulness begins to approach 1, while the degree of harmfulness might not reach the predetermined threshold value (hereinafter, the criterion of harmfulness) after the passing of which the behavior of the executable file will be considered to be malicious (in the graph, this threshold value is designated by a dashed line), and also it might not exceed the criterion of safety, so that the file will continue to be considered safe.

After a period of growth (times A-B), the malicious activity may cease (times B-A) yet the degree of harmfulness will not decline, but only continue to grow during any malicious activity of the executable file, yet not exceed the coefficient of safety, so that the activity of the executable file will be recognized as safe and in consequence said file will be recognized as safe.

In the case when the degree of harmfulness is not calculated on the basis of each behavior pattern formed (for example, because the performance of the computing device is not high), a situation is possible where the degree of harmfulness will be calculated at time B (when the activity is most similar to malicious, i.e., becomes "suspicious") but will not be calculated at time A (when the "suspicious" activity increases) or at time C (when the "suspicious" activity is decreasing); nevertheless, since the degree of harmfulness changes monotonically, the calculated degrees of harmfulness will only increase their values, at times A, B, C the degrees of harmfulness will not exceed the criterion of safety, the activity of the executable file will be recognized as safe, and consequently the safe file will be recognized as safe.

The time of recognizing the file as "suspicious" might not occur after the manifesting of "suspicious" activity, since the described approach affords a smooth growth in the degree of harmfulness, which makes it possible to avoid sharp peaks in the growth of the degree of harmfulness.

Figure 4:
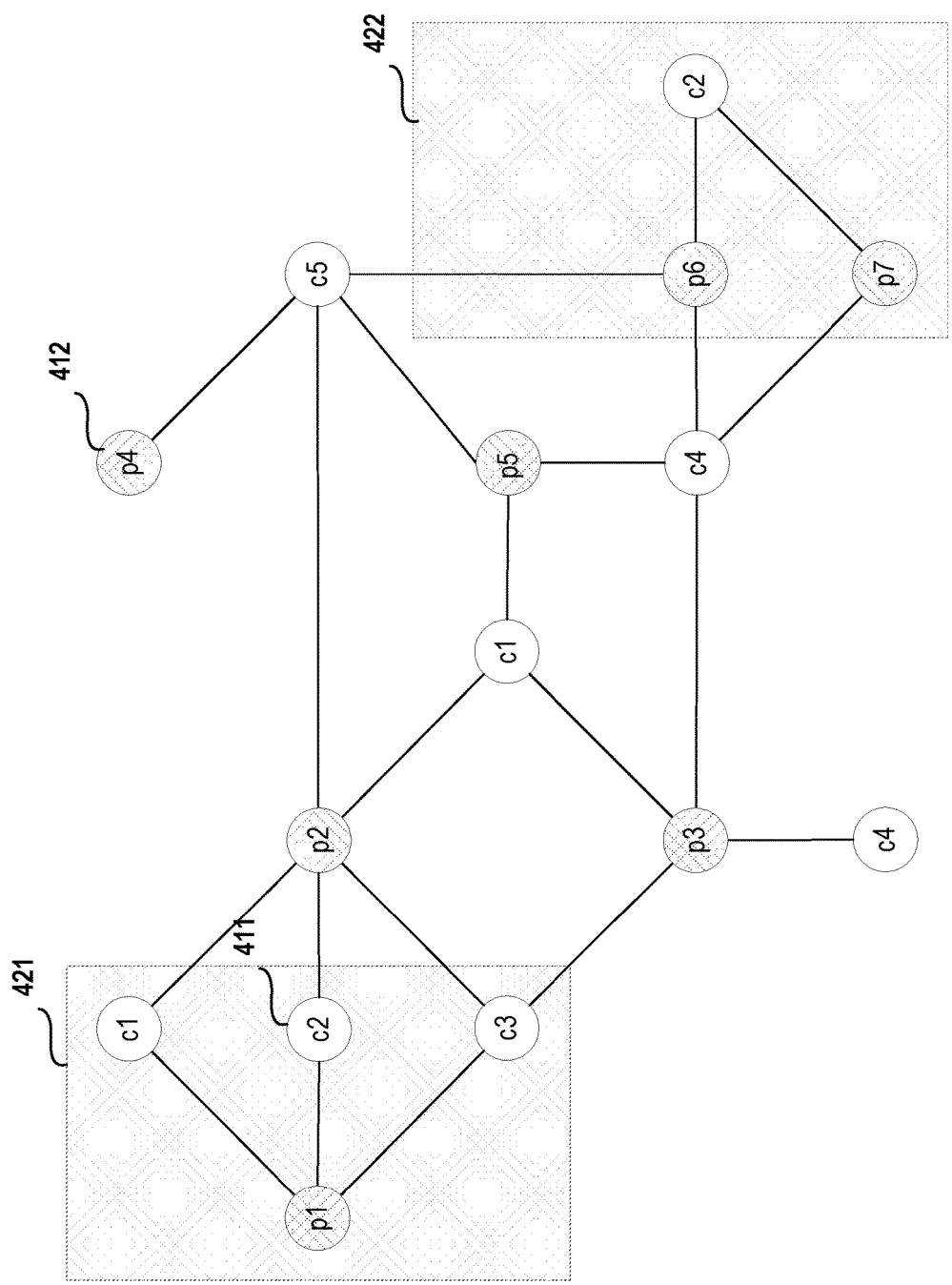
FIG. 4 shows an example of the diagram of relations between elements of behavior patterns in accordance with exemplary aspects of the present disclosure.

FIG. 4 shows an example of the diagram of relations between elements of behavior patterns.

The example of the diagram of relations between elements of behavior patterns contains commands 411 (clear circles), parameters 412 (hatched circles), an example of a behavior pattern with one parameter 412, and an example of a behavior pattern with one command 411.

During the execution of a file, the commands 411 were intercepted and the parameters 412 describing them were determined:

```
CreateFile 0x24e0da54 '.dat'
    {c1, p1, p2}
ReadFile 0x24e0da54 '.dat'
    {c2, p1, p2}
DeleteFile 0x24e0da54 '.dat' 'c:\'
    {c3, p1, p2, p3}
CreateFile 0x708a0b32 '.dat' 0x3be06520
    {c1, p2, p3, p5}
WriteFile 0x708a0b32
    {c4, p3}
WriteFile 0x708a0b32 0x3be06520 0x9902a18d1718b5124728f9 0
    {c4, p3, p5, p6, p7}
CopyMemory 0x3be06520 0x9902a18d1718b5124728f9
    {c5, p4, p5, p6}
ReadFile 0x9902a18d1718b5124728f9 0
    {c2, p6, p7}
```

Behavior patterns (421, 422) are formed on the basis of the mentioned commands 411 and parameters 412, and the relations between elements of the behavior patterns are determined.

In a first step, patterns are formed containing one command 411 and one parameter 412 describing that command:

| | |
|---|---|
| {c1, p1} | {c3, p2} |
| {c1, p2} | {c3, p3} |
| {c1, p3} | {c4, p3} |
| {c1, p5} | {c4, p5} |
| fc2, p1} | {c4, p6} |
| {c2, p2} | {c4, p7} |
| {c2, p6} | {c5, p4} |
| {c2, p7} | {c5, p5} |
| {c3, p1} | {c5, p6} |

In the example shown, 19 behavior patterns have been formed on the basis of 8 intercepted commands (with the parameters describing them).

In the second step, patterns are formed which contain one parameter 412 and all the commands 411 which can be described by that parameter 412:

| | |
|---|---|
| {c1, c2, c3, p1} | {c1, c3, c4, p3} |
| {c1, c2, c3, p2} | {c5, p4} |
| {c1, c4, c5, p5} | {c2, c4, p7} |
| {c2, c4, c5, p6} | |

In the example shown, 7 behavior patterns have been formed in addition on the basis of 8 intercepted commands (with the parameters describing them).

In the third step, patterns are formed which contain several parameters 412 and all the commands 411 which can be described by those patterns 421:
{c1, c2, c3, p1, p2}
{c4, c5, p5, p6}
{c2, c4, p6, p7}

In the example given, 3 behavior patterns have been formed in addition on the basis of 8 intercepted commands (with the parameters describing them).

Figure 5:
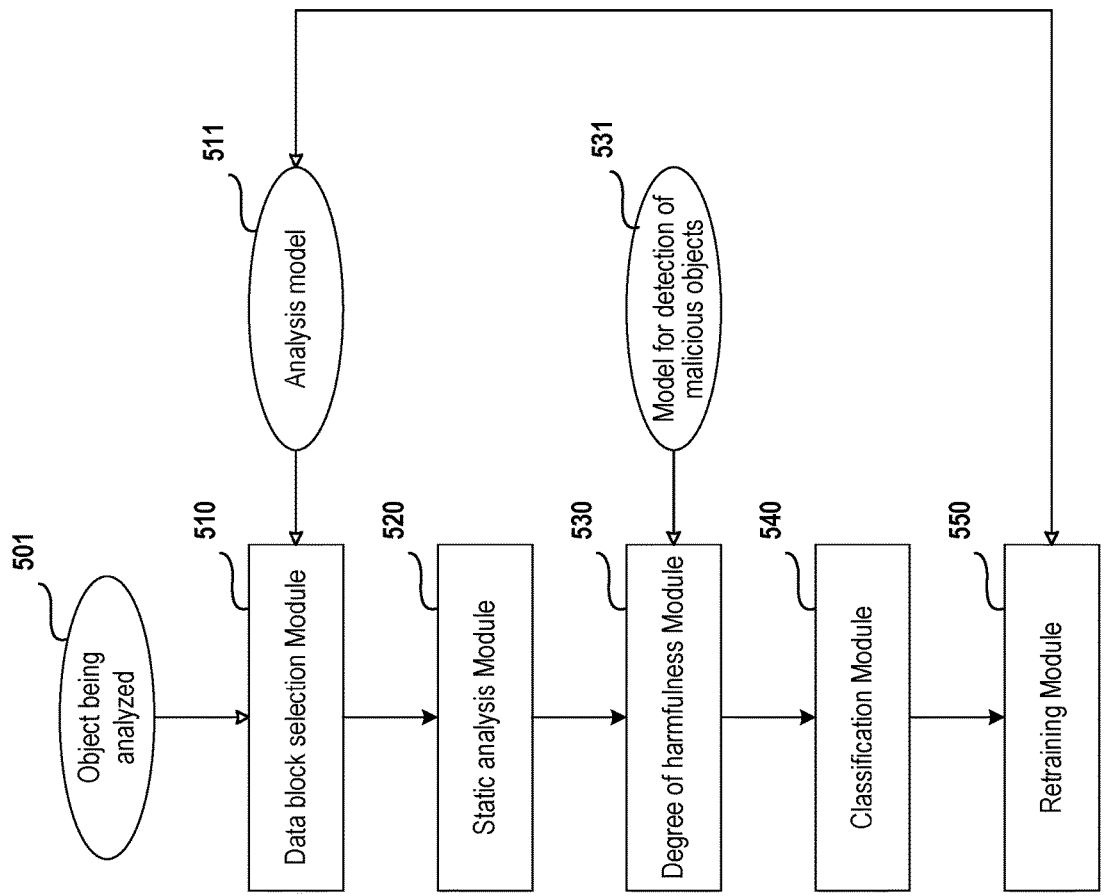
FIG. 5 is a block diagram of a system of classification of objects in accordance with exemplary aspects of the present disclosure.

FIG. 5 shows the structural diagram of the system of classification of objects.

The structural diagram of the system of classification of objects consists of the object being analyzed 501, a data block selection module 510 configured to select a data bblocl, an analysis model 511, a static analysis module 520 configuerd to perform static analysis of an object, a harmfulness module 530 configured to calculate the degree of harmfulness, a model for detection of malicious objects 531, a classification module 540, and a retraining module 550 configured to retrain the analysis model 511.

The object being analyzed 501 will be one of:
an executable file;
a script, and also a file containing that script;
a network packet, or the like.

For example, the object being analyzed 501 may be the executable file "word.exe", which is a component of the Microsoft Office software.

In yet another example, the object being analyzed 501 may be the file "manual.pdf", which is an electronic document PDF.

In yet another example, the object being analyzed 501 may be a script written in the "JavaScript" language and contained on the page "index.html", downloaded by a browser from the site "google.com".

In yet another example, the object being analyzed 501 may be data being transferred by the Internet (for example, from the server application "OnlineBankingServer", which is a service operating on the side of the bank, and processing client requests, to the client application "Online Banking App", running on the computing device of the user), and structured in the form of network packets.

The data block selection module 510 is designed to:
select at least one data block contained in the object being analyzed 501, with the help of the analysis model 511;
send the selected data blocks to the static analysis module 520.

In one aspect of the system, the search for a data block (as one of the elements of the data selection) in the object being analyzed 501 is carried out on the basis of:
the parameters of the object being analyzed 501;
the features of previously found data blocks.

For example, the mentioned parameters of the object being analyzed 501 or the features of previously found data blocks may be used at least as:
keys in the search for new data blocks;
primary data for the calculating of convolutions, by which a search is made for new data blocks;
the forming of rules in the search for new data blocks.

For example, the analysis model 511 is a group of rules for the searching and selecting of data blocks on the basis of the data described above.

In yet another aspect of the system, the selection of data blocks involves at least:
the calculating and sending to the static analysis module 520 of the parameters of data blocks, where the parameters of the data block selected will be at least:
the size of the selected data block,
the position of the selected data block in the object being analyzed 501;
the copying and sending directly to the static analysis module 520 of data contained in the object being analyzed 501 on the basis of the calculated parameters of the block being selected (i.e., on the basis of parameters of the block being selected, such as the dimensions and location, it will be determined how the selected block can be copied from the object being analyzed 501, and how it should be transformed, for example, when copying encrypted data, media data, and so on and so forth).

For example, from the executable file "explorer.exe" a data block is selected that describes the header of that file. For this purpose, there is first determined the type of the file "explorer.exe" (type=WindowsPE), on the basis of the determined type of the file the size of the header is calculated (size=4096 byte), and the position of the header in the mentioned file is determined (pos=0x120). After this, 4096 bytes are copied to the address provided by the static analysis module 520 from the 0x120 position of the file being analyzed "explorer.exe". Generally speaking, information about the structure of files of different types is known beforehand and can be kept in a separate DB and used as needed, so that an executable file (PE file) will be processed with the aid of one algorithm based on information about the structure of the header of executable files, while a PDF file will be processed with the aid of another algorithm on the basis of information about the structure of the header of the PDF file, and so on.

In yet another example, the copying of the same data as in the above example is done by the static analysis module 520 on the basis of the parameters calculated and sent by the data block selection module 510.

In yet another aspect of the system, the parameters of the object being analyzed 501 will be at least:
- the type of object being analyzed (such as an executable file, a script, a network packet);
- data written into the object being analyzed 501 and forming the structure of that object 501, i.e., the set of interrelated data.

For example, data blocks from the object being analyzed 501, being the executable file "explorer.exe", are selected in succession according to the structure of the executable file, i.e., header, code section, data section, and so forth.

In yet another example, the parameters of a Microsoft Word electronic document are the data written in this document and characterizing the fonts used in the document (family, type size, type, and so forth).

In yet another aspect of the system, the features of a previously found data block will be at least:
- the parameters of the data block used for the selecting of that data block from the object being analyzed 501;
- the type of data contained in the data block (for example, the text, the numerical values, the media data, lexemes, script, executable code, and so forth);
- the logical or functional relation (for example, in the form of a binary relation) between that data block and a previously selected data block, wherein a logical relation may arise when two data blocks (or two types of data blocks, such as images and audio) are used together, while they may not be related to each other (such as images and text); a functional relation may arise when data from one block is used for analysis of data from a second block (for example, data from the PE header of an executable file and data from the resources section, about which information is contained in the PE header);
- the coefficient of harmfulness of the object being analyzed 501, calculated on the basis of the aforementioned data block (the data from the data block are used as parameters of the formula for calculating the coefficient of harmfulness, for example, the quantity of each command from the code section of the executable file has its own weight, i.e., the weight appears as a parameter, and the total weight of all the commands from the code section forms the coefficient of harmfulness).

The analysis model 511 is a set of rules to search for data blocks. The search is performed so that each data block found increases the probability of classifying the object being analyzed 501 as malicious.

In one aspect of the system, the rule of searching for a data block may be a rule for calculating the parameters of the sought data block.

For example, with the aid of the rule to search for data blocks, one calculates the position and size of a data block in the object being analyzed 501, such that the mentioned data block starts at a position in the file being analyzed 501 before which a previously selected data block ends, and the size of the mentioned data block is not less than the size of the previously selected data block.

In yet another aspect of the system, the rules for searching for data blocks depend at least on the features of previously found data blocks, where this dependency may involve at least:
- selecting an algorithm (rule) to search for data blocks;
- calculating parameters with the use of previously found data blocks which will be used in rules to search for data blocks;
- predicting the content of a new data block on the basis of previously found data blocks, searching for the predicted data block and determining the degree of similarity of the found data blocks to the predicted one.

For example, in the executable file "explorer.exe" 501 each selected data block should contain data of the same type as the previously selected data block (i.e., media data→media data, text→text, executable code→executable code, and so forth), and in the event that such blocks are absent, then data related to the previously selected data blocks (i.e., media data→text, text→script, script→executable code, and so forth, but not text→executable code). In some aspects, related data types are used in the case when data #1 of type #1 is always related to data #2 of type #2, for example, in a video file the data responsible for the image (type: video data) are always related to the data responsible for the sound (type: audio data).

In yet another aspect of the system, the analysis model 511 has been previously trained by a method for machine learning on at least one malicious object.

For example, the training is done such that the trained analysis model 511 found in the training selection only data blocks containing malicious data (such as malicious code).

In yet another aspect of the system, the method for machine learning of the analysis model 511 may use, at least:
- decision-tree-based gradient boosting;
- decision trees;
- the K-nearest neighbor method;
- the support vector machine (SVM) method.

The static analysis module 520 performs a static analys of the object and is designed to:
- form a set of features describing each received data block;
- calculate the convolution of the sets of the formed set of features;
- send the calculated convolution to the harmfulness module 530.

In one aspect of the system, the features formed for the data block comprise at least:
- the frequency characteristic of predetermined characters being present in the mentioned data block;
- the frequency characteristic of the hash sums calculated for characters from the aforementioned data block with the use of predetermined hash functions being present in the object being analyzed 501;

the number of accesses to external libraries;

the total data volume in the aforementioned data block.

In yet another aspect of the system, the computing of the convolution of the formulated sets of features is performed on the basis of a predetermined convolution function, such that the result of the inverse convolution function of the result of that convolution function performed on all the formulated sets of features has a degree of similarity to that set of features greater than a given value.

For example, on the basis of an analysis of a data block the features $\{p_1, p_7, p_9, p_{11}, p_{12}, p_{15}, p_{27}\}$ were formulated, on the basis of which the convolution $\{h_{128}, h_{763}, h_{909}\}$ was computed. When the inverse function was applied to the computed convolution, the features $\{p_1, p_7, p_{10}, p_{11}, p_{12}, p_{15}, p_{27}\}$ were obtained, in which the feature $p_{10}$ was present in place of the original feature $p_9$, while all the other features were the same as the features used to compute that convolution.

The harmfulness module 530 is designed to: calculate the degree of harmfulness of the object being analyzed 501 on the basis of an analysis of the obtained convolution with the aid of the model for detection of malicious objects 531; and send the calculated degree of harmfulness to the classification module 540.

In one aspect of the system, the degree of harmfulness is a numerical value characterizing the probability that the object being analyzed 501 is malicious.

For example, the degree of harmfulness of the executable file "video.avi.exe", which is an application for secretive encryption of user data Trojan-Ransom.Win32.Agent, is equal to 0.97 (exceeding the predetermined threshold value), which in turn means that this application is malicious, while the degree of harmfulness of the "Google Analytics" script, being a JavaScript application for gathering data on the actions of a user in a browser, is equal to 0.09, which in turn means that this script is safe.

The model for detection of malicious objects 531 is a set of rules for calculating the coefficient of harmfulness of the object being analyzed 501 on the basis of an analysis of data blocks selected from the object being analyzed 501.

In one aspect of the system, the model for detection of malicious objects 531 has been previously trained by a method for machine learning on at least one safe object and malicious object.

In yet another aspect of the system, the method for machine learning of a model for detection of malicious objects 531 is at least: decision-tree-based gradient boosting; decision trees; the K-nearest neighbor method; and the support vector machine (SVM) method.

In yet another aspect of the system, the method of training the model for detection of malicious objects 531 ensures a monotonic change in the degree of harmfulness of the object dependent on the change in the number of formulated sets of features on the basis of the analysis of the data blocks.

For example, 10 data blocks were selected from the malicious file "video.avi.exe". After successive analysis using the model for detection of malicious objects 531 of each of the selected data blocks, said coefficients of harmfulness were calculated:

0.01, 0.02, 0.09, 0.17, 0.19, 0.21, 0.38, 0.53, 0.87, 0.88, that is, the coefficient of harmfulness only increased each time the coefficient was subsequently calculated.

In yet another example, 15 data blocks were selected from the safe file "explorer.exe". After successive analysis using the model for detection of malicious files 532 of each of the selected data blocks, the coefficients of harmfulness were calculated:

0.01, 0.02, 0.02, 0.02, 0.03, 0.08, 0.08, 0.08, 0.08, 0.08, 0.08, 0.09, 0.10. 0.10. 0.10.

that is, the coefficient of harmfulness did not decrease with each subsequent calculation. Instead, the coefficient of harmfulness remained approximately at the same level as in the previous calculation in the event that the selected data block contained no data related to potential malicious activity. The coefficient of harmfulness increased in the event that the selected data block contained data related to potential malicious activity.

The classification module 540 is designed to:

recognize the object being analyzed 501 as safe in the event that the obtained degree of harmfulness does not exceed a predetermined threshold value, wherein said degree of harmfulness was calculated on the basis of all data blocks contained in the object being analyzed 501;

recognize the object being analyzed 501 as malicious in the event that the obtained degree of harmfulness exceeds the predetermined threshold value.

In order to recognize the object being analyzed 501 as malicious, it is sufficient to analyze a limited number of selected data blocks, since as soon as the degree of harmfulness obtained on the basis of analysis of the selected data blocks surpasses the predetermined threshold value, the object being analyzed 501 will be recognized as being malicious. On the other hand, the object is considered to be safe in the event that it was not recognized as being malicious. For a guaranteed recognizing of the object being analyzed 501 as safe, it is required to analyze all data blocks contained in the object being analyzed 501, since only if the degree of harmfulness obtained on the basis of analysis of all data blocks does not surpass the predetermined threshold value is it possible to recognize the object being analyzed 501 as safe. Otherwise, if only a limited number of selected data blocks are analyzed, there is no guarantee that analysis of the next selected data block will not result in the obtained degree of harmfulness surpassing the predetermined threshold value.

For example, upon analysis of the executable file "explorer.exe" the data block selection module 510 selects in succession data blocks contained in "explorer.exe", after each selection of a data block the harmfulness module 530 performs a calculation of the current degree of harmfulness, and each time the calculated degree of harmfulness does not surpass 0.76 (the predetermined threshold value). After all data blocks have been selected (1542 iterations), the degree of harmfulness still did not surpass 0.76 and the classification module 540 will recognize the executable file "explorer.exe" as being safe.

In yet another example, the proposed system upon analyzing the executable file "video.avi.exe", the data block selection module 510 selects in succession data blocks contained in "explorer.exe", after each selection of a data block the harmfulness module 530 performs the calculation of the current degree of harmfulness, and during this calculation the degree of harmfulness increases constantly (with each selected data block): 0.01, . . . 0.17, . . . 0.34, . . . 0.69, . . . 0.81, and in the 35th iteration it begins to surpass 0.76 (the predetermined threshold value). As soon as the calculated degree of harmfulness surpasses the predetermined threshold value, the classification module 540 will recognize the executable file "video.avi.exe" as being malicious.

In one aspect of the system, the classification module 540 will recognize the object being analyzed, depending on the numerical range in which the calculated degree of harmfulness (hereafter, w) lies, as being at least:
  safe—w∈[0.0, $limit_{clean}$),
  that is, the object being analyzed 501 is assured not to cause harm to the user's computing device;
  unknown—w∈[$limit_{clean}$, $limit_{unknown}$),
  that is, the object being analyzed 501 with a large measure of probability will not cause harm to the user's computing device;
  suspicious—w∈[$limit_{unknown}$, $limit_{suspicious}$),
that is, the object being analyzed 501 with a large measure of probability will cause harm to the user's computing device;
  malicious—w∈[$limit_{suspicious}$, 1.0),
  that is, the object being analyzed 501 is assured to cause harm to the user's computing device;
where
  w is the calculated degree of harmfulness,
    $limit_{clean}$ is the predetermined threshold value above which the object being analyzed cannot be classified as safe,
    $limit_{unknown}$ is the predetermined threshold value above which the object being analyzed cannot be classified as unknown,
    $limit_{suspicious}$ is the predetermined threshold value above which the object being analyzed cannot be classified as suspicious.

In the above-described aspect of the system, instead of two clusters of objects (safe and malicious) which can be distinguished by one predetermined threshold value of the coefficient of harmfulness, four clusters are described (safe, unknown, suspicious and malicious), which can be distinguished now by three predetermined threshold values. The predetermined threshold value $limit_{suspicious}$ corresponds to the predetermined threshold value of the two-cluster system described above, beyond which the objects being analyzed will be recognized as malicious.

For example, the executable file "radmin.exe", which is a component of the "Remote Administrator" software designed for remote control of computing devices and having a coefficient of harmfulness of 0.56, will be considered to be suspicious (w∈[0.50, 0.80)), since it allows a controlling of computing devices concealed from the users of those computing devices, being often used to carry out malicious activity. The coefficient of harmfulness is determined on the basis of data selected from the object being analyzed 501, the data so selected carrying out the functionality of the object being analyzed 501, so that the coefficient of harmfulness so calculated is related to the functionality of the object being analyzed 501 as provided by the selected data.

In yet another aspect of the system, the search for and picking out of at least one data block and the calculating of the degree of harmfulness are done in succession, one after another, until such time as at least:
  the object being analyzed 501 is recognized as being malicious;
  all data blocks are found and picked out.

For example, from the object being analyzed 501 the data block selection module 510 selects several data blocks, on the basis of which the harmfulness module 530 calculates the degree of harmfulness, and the classification module 540 will recognize the object being analyzed 501 as safe or malicious.

In yet another example, from the object being analyzed 501 the data block selection module 510 selects only one data block, on the basis of which the harmfulness module 530 calculates the degree of harmfulness, while the classification module 540 will recognize the object being analyzed 501 as malicious in the event that it is not possible to recognize the object being analyzed 501 as malicious (the calculated degree of harmfulness does not surpass the predetermined threshold value). The above-described cycle is performed once more—yet another data block is selected, and so on, until the object being analyzed 501 is recognized as being malicious or until all data blocks have been selected, after which the object being analyzed 501 will be recognized as being safe.

The retraining module 550 is designed to retrain the analysis model 511 after the object being analyzed 501 was recognized as being malicious, so that the recognizing of the object being analyzed 501 as malicious is accomplished on the basis of the analysis of a smaller number of data blocks picked out from the object being analyzed 501 than was needed prior to the retraining of that analysis model 511.

For example, during the classification the executable file "video.avi.exe", which is a malicious file encrypter, was recognized as being malicious by the classification module 540 after performing 512 iterations of selection of data blocks from that file, and the final calculated coefficient of harmfulness was equal to 0.87 (with a predetermined threshold value of 0.78, after which the object being analyzed will be recognized as malicious). After retraining of the analysis model 511 during a second classification the file "video.avi.exe" was recognized as being malicious after performing 260 iterations of selection of data blocks from that file, the final calculated coefficient of harmfulness being equal to 0.79. This result was accomplished thanks to the fact that the retrained analysis model 511 more often selected those data blocks on the basis of which the calculated coefficient of harmfulness was higher.

The fact that, in certain instances, the calculated coefficient of harmfulness after performing iteration N might be significantly less than the predetermined threshold value (such as 0.60 compared to 0.75), while after performing iteration N+1 it is significantly larger (for example, 0.85 compared to 0.75), is explained in that the growth function of the coefficient of harmfulness is not smooth, but rather discrete, on account of the finite number of iterations, and therefore it may change in large steps, and the size of that step will be larger as the analysis model 511 is better trained.

In yet another aspect of the system, the retraining of the analysis model 511 is done after the conclusion of the classification of the object being analyzed 501 by the classification module 540. The retraining may be performed regardless of the result of the classification of that object 501, such that, in a repeated analysis of that object 501 using the retrained analysis model 511 during each iteration of the selection of a data block from the object being analyzed 501, the calculated coefficient of harmfulness on the basis of that data block is not lower than when using the non-retrained analysis model 511.

For example, during the classification the executable file "explorer.exe", which is a malicious file encrypter, was recognized by the classification module 540 as being safe after performing 10240 iterations of the selection of data blocks from that file (i.e., all the data blocks from the file being analyzed), and the final calculated coefficient of harmfulness was equal to 0.09. After retraining of the analysis model 511 in a repeat classification, the file "explorer.exe" was recognized as being safe, while the coefficient of harmfulness of 0.09 was calculated after only 2050 iterations, and no longer changed after that. This result was accomplished thanks to the fact that the retrained analysis model 511 more often selected those data blocks on the basis of which the calculated coefficient of harmfulness was higher.

Since the analysis model 511 is constantly retrained on the basis of the results of analysis of the objects being analyzed 501, on average during each subsequent analysis of a malicious object 501 a lesser number of data blocks will be selected and analyzed (fewer iterations will be performed) than for the previously examined malicious objects 501, because the coefficient of harmfulness calculated for the malicious object will surpass the predetermined threshold value and the object being analyzed 501 will be recognized as being malicious ever more early. But if the object being analyzed 501 is not malicious, then all available data blocks will be selected. However even in this case after analysis of all selected data blocks the analysis model 511 will be retrained so that, even during the analysis of a safe object 501, the calculated coefficient of harmfulness will try to surpass the predetermined threshold value as fast as possible (although it will not surpass that coefficient), with the rate of growth of that coefficient of harmfulness tending toward a maximum, which means that when analyzing an already malicious object 501 the number of data blocks selected will tend toward a minimum.

The retraining of the analysis model 511 on safe files thus makes it possible to boost its effectiveness also in the analysis of malicious files.

After performing the classification of the object being analyzed 501, in the event that the object 501 is recognized as being malicious, a procedure for remediating the computing device on which said object was detected may be performed by outside means.

Figure 6:
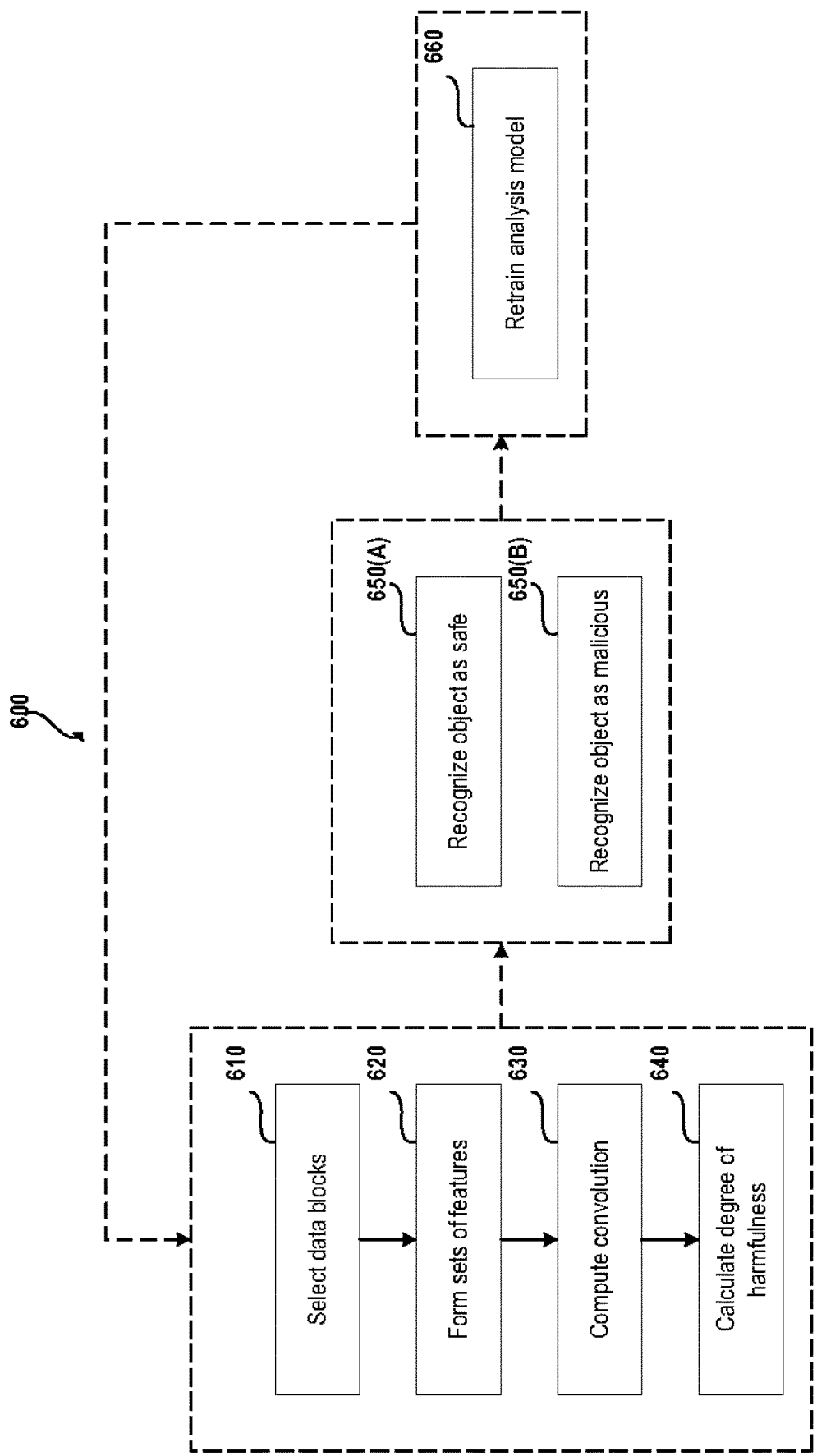
FIG. 6 is a flowchart for a method of classification of objects in accordance with exemplary aspects of the present disclosure.

FIG. 6 is a flowchart of a method 600 of classification of objects according to one aspect of the present disclosure. Briefly, the method 600 comprises: at step 610, data blocks are selected; at step 620, sets of features are formed; at step 630, the convolution is calculated; at step 640, the degree of harmfulness is calculated; at step 650(A), the object is recognized as being safe; at step 650(B), the object is recognized as being malicious; and, at step 660, the analysis model is retrained.

More specifically, in step 610, at least one data block is selected, which is contained in the object being analyzed 501, with the help of the analysis model 511, the analysis model 511 being a set of rules to search for data blocks, the rules being formulated such that each data block found increases the probability of classifying the object being analyzed 501 as malicious.

In step 620, for each data block selected in step 610 there are formed sets of features describing that data block.

In step 630, the convolution of all formulated sets of features in step 620 is computed.

In step 640, the degree of harmfulness of the object being analyzed 501 is calculated on the basis of an analysis of the convolution computed in step 630 with the help of the model for detection of malicious objects 531.

In step 650(A), the object being analyzed 501 is recognized as being safe in the event that the degree of harmfulness as calculated in step 640 does not surpass a predetermined threshold value and that degree of harmfulness was calculated on the basis of all the data blocks contained in the object being analyzed 501.

In step 650(B), the object being analyzed 501 is recognized as being malicious in the event that the degree of harmfulness as calculated in step 640 surpasses the predetermined threshold value.

In step 660, after the object being analyzed 501 was recognized as being malicious, the analysis model 511 is retrained so that the recognizing of the object being analyzed 501 as malicious is accomplished on the basis of analysis of a smaller number of data blocks picked out from the object being analyzed 501 than was needed prior to the retraining of that analysis model 511.

Figure 7:
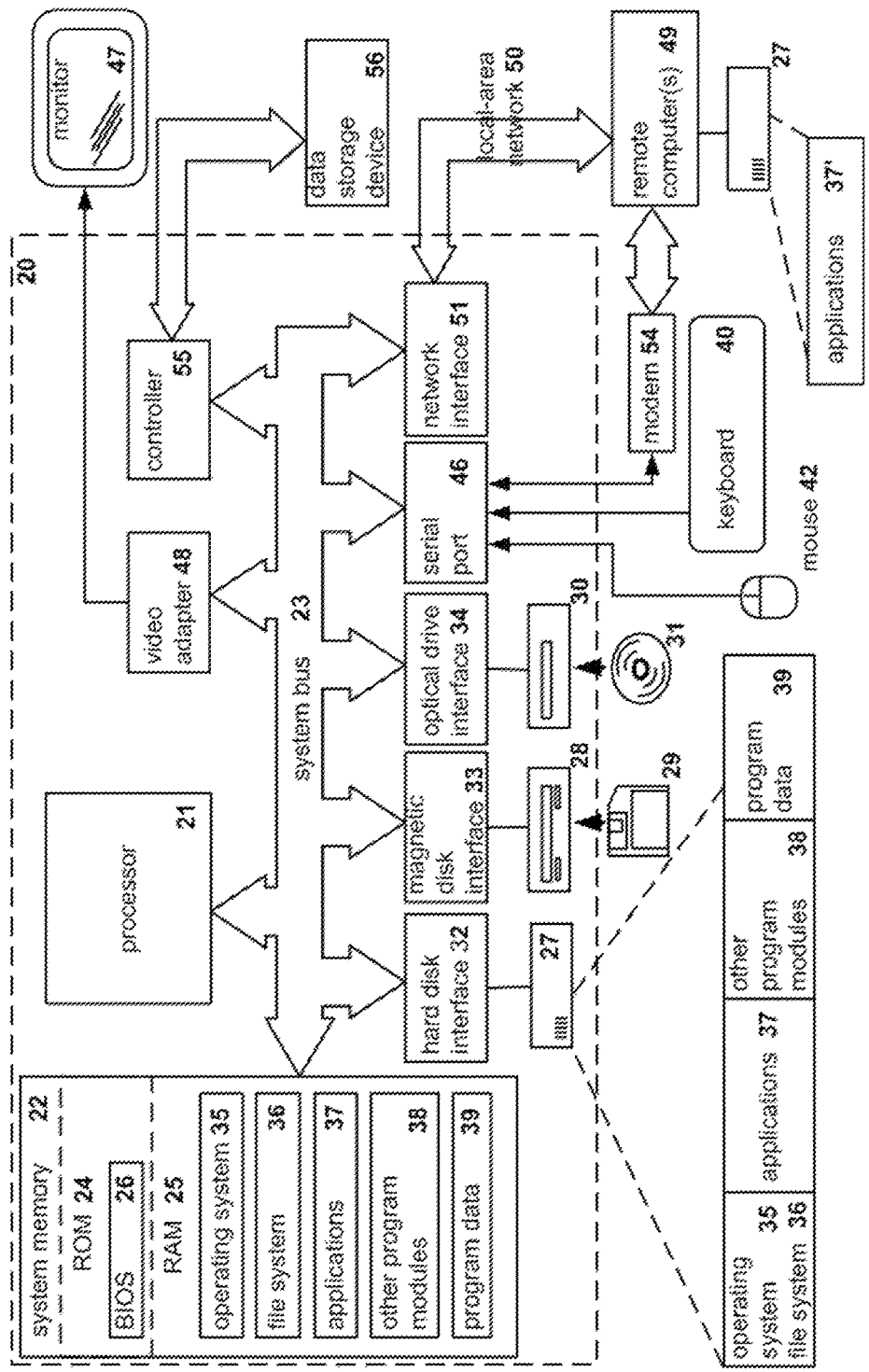
FIG. 7 shows an example of a general-purpose computer system, a personal computer or a server in accordance with exemplary aspects of the present disclosure.

FIG. 7 illustrates a block diagram of an example of a general-purpose computer system (which can be a server) on which the disclosed system and method can be implemented according to an example aspect. In particular, FIG. 7 can illustrate an exemplary aspect of the system 100 and/or components of the system 100. As shown, a general purpose computing device is provided in the form of a computer 20 or the like including a processing unit 21, a system memory 22, and a system bus 23 that couples various system components including the system memory to the processing unit 21. It should be appreciated that the processing unit 21 can correspond to CPU 114 and/or CPU 144, and system memory 22 and/or file system 36 can correspond to the electron memory to store data files or memory 148, for example.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20. The logical connections include a network interface 53 and connected to a local area network (i.e., LAN) 51, for example, and/or a wide area network (not shown). Such networking environments are commonplace in offices, enterprise-wide computer networks, Intranets and the Internet. It should be appreciated that remote computers 49 can correspond to one or more storage nodes, such as storage nodes 102-107, as described above.

When used in a LAN networking environment, the computer 20 is connected to the local network 51 through a network interface or adapter 53. When used in a WAN networking environment, the computer 20 typically includes a modem 54 or other mechanisms for establishing communications over the wide area network, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other mechanisms of establishing a communications link between the computers may be used.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for training a malware detection model, comprising:
generating, by a processor, a plurality of behavior patterns based on one or more logs of commands executed on a computing device, wherein each of the plurality of behavior patterns is represented by a feature vector and wherein the plurality of behavior patterns is generated by calculating a hash sum for each pattern element of the behavior pattern and setting a corresponding bit in the feature vector depending on the calculated hash sum;
calculating, by the processor, an effectiveness of each of a plurality of methods for machine learning based on the plurality of behavior patterns;
determining, by the processor, a preferred method for machine learning from the plurality of methods for machine learning by selecting the preferred method as a method with the greatest effectiveness from the plurality of methods for machine learning;
obtaining, by the processor, parameters of the malware detection model by applying convolution functions to the plurality of behavior patterns;
training, by the processor, the malware detection model to detect malicious files using the preferred method for machine learning.

2. The method of claim 1, wherein the preferred method is different from a previously selected preferred method that was used to train the malware detection model.

3. The method of claim 1, further comprising:
applying the selected preferred method for machine learning to a previously created detection model, wherein parameters of the previously created detection model are unable to produce output data with an accuracy higher than a predetermined threshold.

4. The method of claim 1, wherein the effectiveness is measured according to a number of errors when using the method for machine learning to detect malicious files based on the behavior patterns.

5. The method of claim 4, wherein the behavior patterns are of a particular kind, the particular kind one of: a data structure, a number of elements of the plurality of behavior patterns, performance of the computing device, available resources of the computing device.

6. The method of claim 1, further comprising:
selecting the method for machine learning according to one or more of: cross testing, mathematical validation of one or more of: Akaike Information Criterion (AIC) and Bayesian Information Criterion (BIC), split testing and stacking.

7. The method of claim 1, wherein determining the preferred method comprises:
selecting an artificial neural network as the preferred method when the effectiveness is greater than a random forest as the preferred method, otherwise selecting the random forest as the preferred method;

initializing a method of numerical optimization of parameters of the artificial neural network when the artificial neural network is selected; and initializing a separating criterion for nodes in the random forest when the random forest is selected.

8. The method of claim 7, further comprising;

selecting the random forest as the method for machine learning when performance of the computing device is below a predetermined threshold, otherwise:

selecting the artificial neural networks as the method for machine learning.

9. A system for training a malware detection model, comprising:

a hardware processor configured to:

generate a plurality of behavior patterns based on one or more logs of commands executed on a computing device, wherein each of the plurality of behavior patterns is represented by a feature vector and wherein the plurality of behavior patterns is generated by calculating a hash sum for each pattern element of the behavior pattern and setting a corresponding bit in the feature vector depending on the calculated hash sum;

calculate an effectiveness of each of a plurality of methods for machine learning based on the plurality of behavior patterns;

determine a preferred method for machine learning from the plurality of methods for machine learning by selecting the preferred method as a method with the greatest effectiveness from the plurality of methods for machine learning;

obtain parameters of the malware detection model by applying convolution functions to the plurality of behavior patterns;

training the malware detection model to detect malicious files using the preferred method for machine learning.

10. The system of claim 9, wherein the preferred method is different from a previously selected preferred method that was used to train the malware detection model.

11. The system of claim 9, the hardware processor further configured to:

apply the selected preferred method for machine learning to a previously created detection model, wherein parameters of the previously created detection model are unable to produce output data with an accuracy higher than a predetermined threshold.

12. The system of claim 9, wherein the effectiveness is measured according to a number of errors when using the method for machine learning to detect malicious files based on the behavior patterns.

13. The method of claim 12, wherein the behavior patterns are of a particular kind, the particular kind one of: a data structure, a number of elements of the plurality of behavior patterns, performance of the computing device, available resources of the computing device.

14. The method of claim 9, the hardware processor further configured to:

select the method for machine learning according to one or more of: cross testing, mathematical validation of one or more of: Akaike Information Criterion (AIC) and Bayesian Information Criterion (BIC), split testing and stacking.

15. The method of claim 9, wherein the hardware processor determines the preferred method by:

selecting an artificial neural network as the preferred method when the effectiveness is greater than a random forest as the preferred method, otherwise selecting the random forest as the preferred method;

initializing a method of numerical optimization of parameters of the artificial neural network when the artificial neural network is selected; and initializing a separating criterion for nodes in the random forest when the random forest is selected.

16. The method of claim 15, the hardware processor further configured to;

select the random forest as the method for machine learning when performance of the computing device is below a predetermined threshold, otherwise:

select the artificial neural networks as the method for machine learning.

17. A non-transitory computer-readable medium, storing instructions thereon, which when executed perform a method for training a malware detection model, comprising:

generating, by a processor, a plurality of behavior patterns based on one or more logs of commands executed on a computing device, wherein each of the plurality of behavior patterns is represented by a feature vector and wherein the plurality of behavior patterns is generated by calculating a hash sum for each pattern element of the behavior pattern and setting a corresponding bit in the feature vector depending on the calculated hash sum;

calculating, by the processor, an effectiveness of each of a plurality of methods for machine learning based on the plurality of behavior patterns;

determining, by the processor, a preferred method for machine learning from the plurality of methods for machine learning by selecting the preferred method as a method with the greatest effectiveness from the plurality of methods for machine learning;

obtaining, by the processor, parameters of the malware detection model by applying convolution functions to the plurality of behavior patterns;

training, by the processor, the malware detection model to detect malicious files using the preferred method for machine learning.

18. The medium of claim 17, wherein the preferred method is different from a previously selected preferred method that was used to train the malware detection model.

19. The medium of claim 17, the method further comprising:

applying the selected preferred method for machine learning to a previously created detection model, wherein parameters of the previously created detection model are unable to produce output data with an accuracy higher than a predetermined threshold.

20. The medium of claim 17, wherein the effectiveness is measured according to a number of errors when using the method for machine learning to detect malicious files based on the behavior patterns.

21. The medium of claim 20, wherein the behavior patterns are of a particular kind, the particular kind one of: a data structure, a number of elements of the plurality of behavior patterns, performance of the computing device, available resources of the computing device.

22. The medium of claim 17, the method further comprising:

selecting the method for machine learning according to one or more of: cross testing, mathematical validation of one or more of: Akaike Information Criterion (AIC) and Bayesian Information Criterion (BIC), split testing and stacking.

23. The medium of claim 17, wherein determining the preferred method comprises:
- selecting an artificial neural network as the preferred method when the effectiveness is greater than a random forest as the preferred method, otherwise selecting the random forest as the preferred method;
- initializing a method of numerical optimization of parameters of the artificial neural network when the artificial neural network is selected; and
- initializing a separating criterion for nodes in the random forest when the random forest is selected.

24. The medium of claim 23, the instructions further comprising;
- selecting the random forest as the method for machine learning when performance of the computing device is below a predetermined threshold, otherwise:
- selecting the artificial neural networks as the method for machine learning.

\* \* \* \* \*